(12) United States Patent
Fox

(10) Patent No.: US 11,345,443 B2
(45) Date of Patent: May 31, 2022

(54) METHOD AND APPARATUS FOR MONITORING THE STATUS OF A BOAT

(71) Applicant: Brian James Fox, Eldorado, WI (US)

(72) Inventor: Brian James Fox, Eldorado, WI (US)

(73) Assignee: ANGLER ARMOR LLC, Eldorado, WI (US)

( * ) Notice: Subject to any disclaimer, the term of this patent is extended or adjusted under 35 U.S.C. 154(b) by 14 days.

(21) Appl. No.: 16/912,865

(22) Filed: Jun. 26, 2020

(65) Prior Publication Data
US 2020/0407019 A1    Dec. 31, 2020

Related U.S. Application Data

(60) Provisional application No. 62/868,504, filed on Jun. 28, 2019.

(51) Int. Cl.
*G08B 23/00* (2006.01)
*B63B 17/00* (2006.01)
(Continued)

(52) U.S. Cl.
CPC ............. *B63B 17/00* (2013.01); *G08B 13/02* (2013.01); *G08B 25/008* (2013.01); *G08B 25/10* (2013.01); *G08B 29/16* (2013.01); *H04W 4/021* (2013.01); *H04W 4/027* (2013.01); *H04W 4/029* (2018.02); *B63B 2017/0009* (2013.01); *H04W 52/0277* (2013.01); *H04W 52/0296* (2013.01); *H04W 84/20* (2013.01)

(58) Field of Classification Search
CPC . B63B 17/00; B63B 2017/0009; B63B 34/05; G08B 25/10; G08B 25/008; G08B 29/16; G08B 13/02; G08B 13/1436; H04W 4/029; H04W 4/021; H04W 4/027;
(Continued)

(56) References Cited

U.S. PATENT DOCUMENTS 4,884,208 A * 11/1989 Marinelli ............. G01S 5/0009
                                                          701/300
6,265,966 B1    7/2001 Ireland
(Continued)

FOREIGN PATENT DOCUMENTS

GB          2445587 A     7/2008
KR       102009287 B1     8/2019

*Primary Examiner* — Anh V La
(74) *Attorney, Agent, or Firm* — Michael Best & Friedrich LLP

(57) ABSTRACT

A status monitoring system and the devices used for the status monitoring system is disclosed. The status monitoring system includes a controller device, a plurality of rod monitoring devices, and a motor monitoring device which works together to provide a layered approach to securing the boat. The controller device is configured to communicate with a smart device via cellular network. The controller device triggers an alert once it detects unexpected events on the boat or receives intrusion notifications from other devices in the status monitoring system. Unexpected events can include the boat moving out of the geofence, boat vibration, and unexpected starting of the vehicle. A method for monitoring the status of the boat is also disclosed. The method can include receiving an activation signal, receiving a GPS signal, receiving vibration signals, energizing the siren and transmitting notification and boat location to the cloud when detecting at least one trigger.

15 Claims, 12 Drawing Sheets

(51) Int. Cl.
*G08B 25/10* (2006.01)
*G08B 25/00* (2006.01)
*H04W 4/029* (2018.01)
*H04W 4/021* (2018.01)
*G08B 29/16* (2006.01)
*G08B 13/02* (2006.01)
*H04W 4/02* (2018.01)
*H04W 84/20* (2009.01)
*H04W 52/02* (2009.01)

(58) Field of Classification Search
CPC ............. H04W 84/20; H04W 52/0277; H04W 52/0296; Y02D 30/70
USPC .......... 340/984, 985, 987, 426.1, 568.1, 571
See application file for complete search history.

(56) References Cited

U.S. PATENT DOCUMENTS

| | | | |
|---|---|---|---|
| 6,469,641 B1 | 10/2002 | Lash | |
| 6,553,336 B1 | 4/2003 | Johnson et al. | |
| 6,658,349 B2 | 12/2003 | Cline | |
| 7,218,227 B2 * | 5/2007 | Davis | G08B 13/24 340/572.1 |
| 8,022,844 B2 | 9/2011 | Knoska et al. | |
| 8,058,985 B2 | 11/2011 | Dobson et al. | |
| 8,531,316 B2 | 9/2013 | Velado et al. | |
| 8,676,402 B1 | 3/2014 | Foster | |
| 8,994,562 B1 | 3/2015 | Daniel | |
| 8,996,210 B2 | 3/2015 | Kish | |
| 9,284,032 B1 | 3/2016 | Snyder | |
| 10,442,501 B2 | 10/2019 | Calagaz | |
| 10,546,501 B2 | 1/2020 | Berggren | |
| 2002/0118102 A1 | 8/2002 | Fundak | |
| 2006/0176193 A1 | 8/2006 | Wraight | |
| 2008/0122655 A1 | 5/2008 | Sedelius Horberg et al. | |
| 2008/0278345 A1 * | 11/2008 | Van Bosch | H04B 7/18517 340/870.07 |
| 2009/0037040 A1 * | 2/2009 | Salmon | B63H 21/21 701/21 |
| 2015/0162762 A1 * | 6/2015 | Yuan | H02J 7/008 320/109 |
| 2018/0134176 A1 * | 5/2018 | Symanow | B60L 58/12 |

\* cited by examiner

METHOD AND APPARATUS FOR MONITORING THE STATUS OF A BOAT

CROSS-REFERENCE TO RELATED APPLICATION

The present application is related to and claims the priority benefit of U.S. Provisional Patent Application No. 62/868,504, filed on Jun. 28, 2019, the entire contents of which are hereby incorporated by reference.

TECHNICAL FIELD

The present disclosure relates to systems and methods for monitoring the status of a boat.

INTRODUCTION

It is easy to find fishing boats and related equipment for fishing boats. While the cost to own a fishing boat is continuously rising, the number of boat thefts has also increased. Whereas the theft of the entire vehicle is of major concern, owners of fishing boats also invest a lot in tackle, gear and electronics for their boats. By using multiple layers of a monitoring system, boat owners can be assured of getting the best protection possible to monitor their possessions. A system with a design using wireless sensors allows the installation process to be easy and simple for the user. Adopting the latest technology, the system ensures that the user receives timely information related to their fishing boat anywhere a cellular signal is present.

SUMMARY

The present disclosure relates to an alarm system but more specifically relates to systems and methods for monitoring the status of the boat. The system is more specifically designed as a status monitoring system for a fishing boat. The system alerts the user to unauthorized entry into the boat, unauthorized entry into the rod lockers or moving the boat in its entirety from the geofenced location. The system is configured to react to a local trigger and transmit the result remotely to the end user. The system provides multiple triggers that monitor various conditions of the boat and its related equipment. The system provides a layered approach to secure the boat by using multiple sensors to monitor the rod lockers, boat and boat motor.

The status monitoring system uses a central controller device that is a master node of the wireless mesh network and is configured to receive triggers from rod monitoring devices which are slave nodes and are placed inside each rod locker. A user can easily install the controller device on a boat without altering the condition of the boat by simply attaching two wires to apply a power supply to the controller device. If the user decides to use the ignition cut off circuit, additional two wires will be required. The controller device also includes a siren. The rod monitoring devices utilize low power digital components designed to run on a rechargeable battery for extended periods of time and require no further wiring, connections or programming by the end user. The user can use the rod monitoring devices by simply attaching the batteries to power the devices, which will then pair with the controller device. The system allows the rod monitoring devices to operate for extended run times on battery power only. The motor monitoring device is used to monitor the status of an outboard motor. The motor monitoring device has a motor node which can communicate with the master node on the controller device. The motor monitoring device can function either as part of the status monitoring system controlled by the controller device or as a standalone device.

The system utilizes a smart device that a potential end user already owns. The user can arm, disarm, monitor and receive notifications related to the condition and state of the boat using the smart device. The cloud connection between the smart device and the controller device provides the remote user with real time notifications about the status of the boat as well as boat location. If either the smart device or the controller device loses connection to the cellular network, cellular communications cannot take place in the status monitoring system. However, when the smart device or the controller device re-connects to the cellular network, the system will revert back to the last known state.

DETAILED DESCRIPTION

Figure 1:
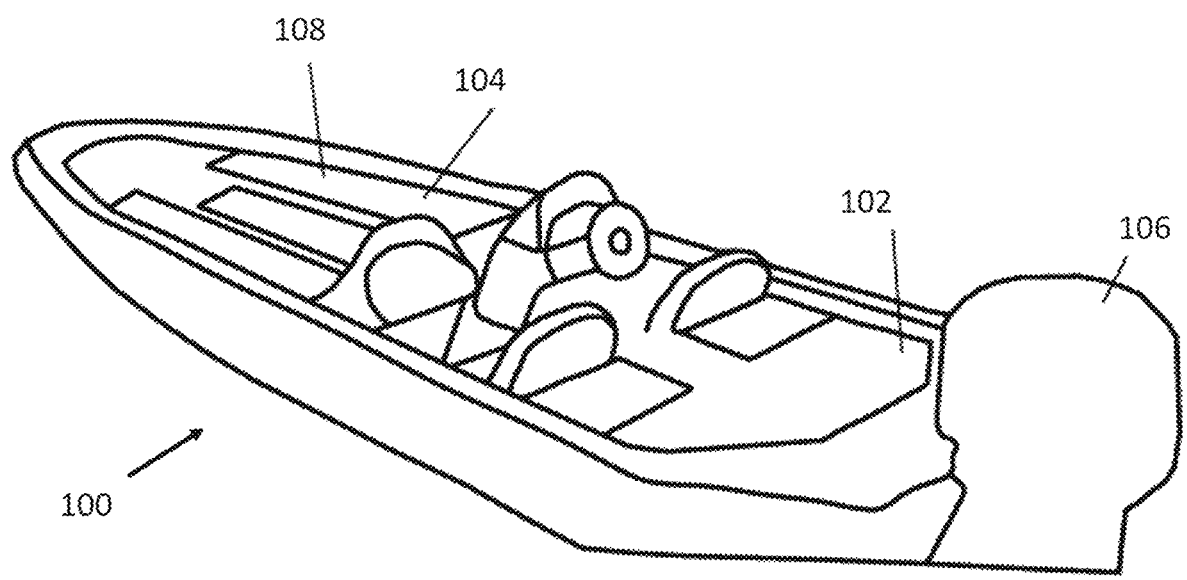
FIG. 1 is an example of a boat having a status monitoring system embodying features consistent with the present disclosure.

FIG. 1 shows a perspective view of a boat 100 equipped with various components of an embodiment of a status monitoring system. The boat 100 equipped with the exemplary status monitoring system can comprise three types of devices: a controller device 102, at least one rod locker monitoring device 104, and a motor monitoring device 106. Additional details about components of an exemplary status monitoring system are described below with reference to FIG. 2.

In some implementations, the status monitoring system may be specifically configured as a status monitoring system for a tournament style fishing boat. If the boat 100 is a fishing boat, the boat 100 equipped with the proposed status monitoring system can comprise a controller device 102 and at least one rod locker monitoring device 104. The status monitoring system can include up to five rod locker monitoring devices 104.

In other embodiments, the boat 100 may be a pontoon boat or a ski boat which does not have rod lockers. If the user uses the status monitoring system to protect the motor, the boat 100 can be equipped with a controller device 102 and a motor monitoring device 106 without the rod locker monitoring device 104. The motor monitoring device 106 can work as part of the status monitoring system along with the controller device 102 or the motor monitoring device 106 can be used independently as a standalone device. When the user wants to monitor only the motor but not the whole boat, the user can only use the motor monitoring device 106. In a standalone configuration, the user does not need to have the controller device 102.

The controller device 102 which works as a master node can communicate with the rod locker monitoring device 104 and the motor monitoring device 106 via a wireless mesh network based on Bluetooth Low Energy (BLE). The status monitoring system 200 is described in more detail below with reference to FIG. 2. FIG. 1 shows possible mounting locations of the devices 102, 104, 106. In this embodiment, the controller device 102 can be mounted in the battery compartment of the boat. The rod locker monitoring device 104 can be mounted in a rod locker 108. The motor monitoring device 106 can possibly be mounted under the cowling of the boat motor. The motor monitoring device 106 can be used as part of the mesh network or as a standalone device. In this example, the motor monitoring device 106 is used as part of the mesh network. The devices 102, 104, 106 can communicate over distances of up to 30 meters when communicating via BLE. Therefore, the status monitoring system could work on a boat where the distance from the controller device 102 to the furthest rod locker monitoring device 104 or the motor monitoring device 106 does not exceed 30 meters.

Figure 2:
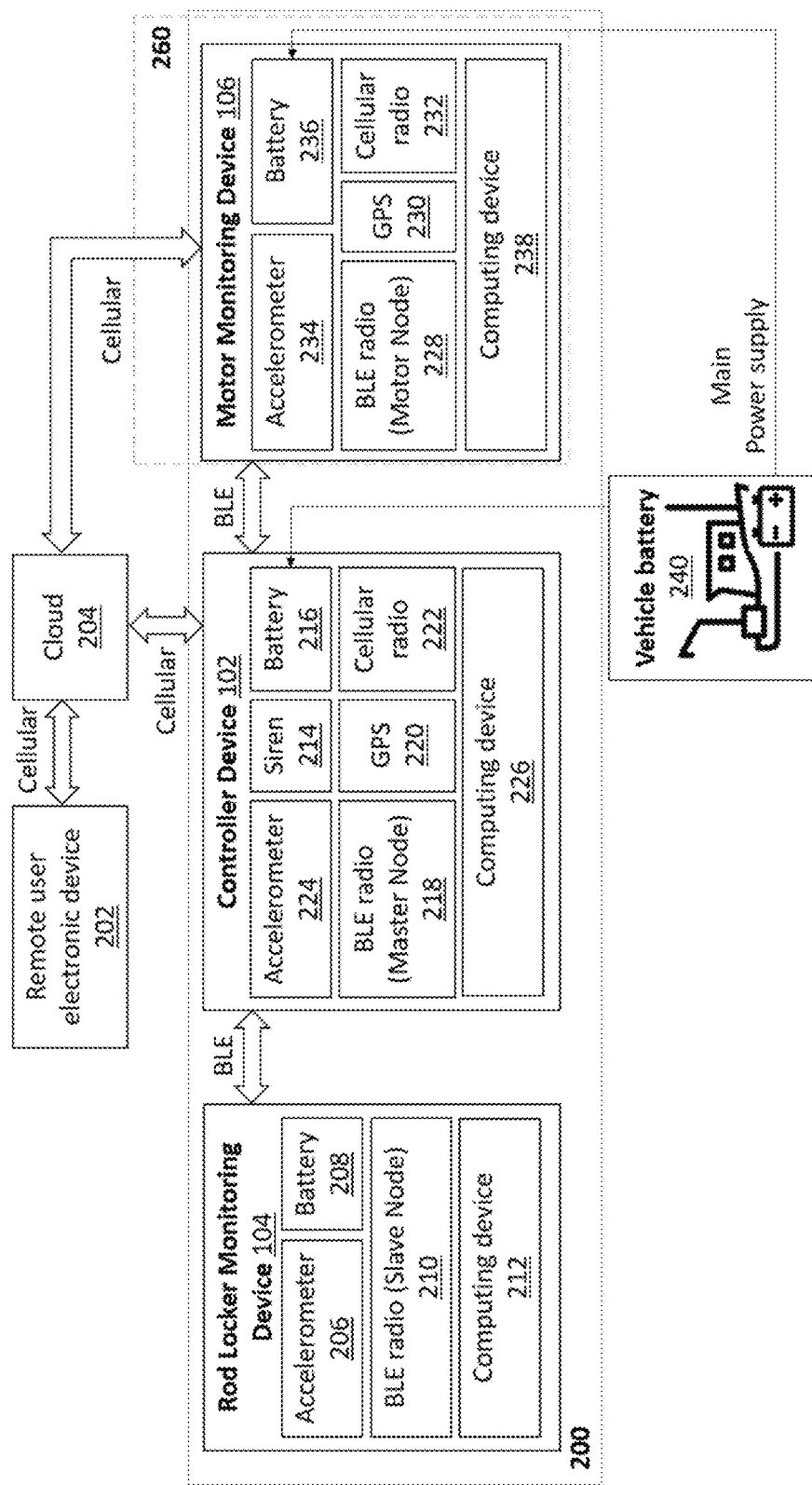
FIG. 2 is a schematic view of various components in an exemplary status monitoring system.

FIG. 2 is a schematic view of an example status monitoring system 200. As shown, the status monitoring system 200 may comprise a controller device 102, at least one rod locker monitoring device 104, and a motor monitoring device 106 from FIG. 1. In some embodiments, the status monitoring system 200 can comprise a controller device 102, and five rod locker monitoring devices 104. Other embodiments may include more or fewer components. In some implementations, the user can use a status monitoring system 260 with only a motor monitoring device 106 in a standalone configuration which then performs the tasks of the controller device 102 itself.

A controller device 102 is the central device that performs many tasks related to the status monitoring system 200. The controller device 102 includes a siren 214, a controller battery 216, a BLE radio 218, a GPS receiver 220, a cellular radio 222, a controller accelerometer 224, and a computing device 226. The controller device 102 is configured to trigger an alarm when an unexpected event is detected on the controller device 102. The controller device 102 also triggers the alarm upon receiving triggers from the rod locker monitoring device 104 or the motor monitoring device 106 via wireless mesh network. The user can choose to use the siren 214 or not. If used, the controller device 102 sounds the siren 214 once a trigger condition is met. The siren 214 works to scare the intruder away.

The controller device 102 communicates with the rod locker monitoring device 104 or the motor monitoring device 106 via short-range wireless communication. The short-range wireless communication can be performed using BLE. The controller device 102, the rod locker monitoring device 104, and the motor monitoring device 106 each includes a BLE radio 210, 218, 228. BLE is a short-range radio technology that works for distances up to several meters. BLE radio enables easy, low power wireless connection between multiple devices. BLE radio supports multiple network topologies including mesh networking which enables the proposed status monitoring system 200 work. In this embodiment, the wireless communications are encrypted to prevent crosstalk between other systems and to prevent hostile attacks to the status monitoring system 200. Only devices that are registered to the controller device 102 at the time of the build can communicate with the controller device 102 via shore-range wireless communication.

The controller device 102 also carries out cellular communications with the remote user electronic device 202. The controller device 102 includes a cellular radio 222. The controller device 102 can communicate to a cloud 204, and then to the remote user electronic device 202 via a cellular network. The cellular communication can be performed using standard communications such as 3rd generation (3G) and long-term evolution (LTE). The cloud 204 refers to a centralized server that is accessed over the internet which can manage connections via Wi-Fi and cellular networks. The cloud 204 helps a user to connect data rapidly between the controller device 102 and the remote user device 202. If the status monitoring system 200 detects an unexpected event, the controller device 102 transmits an event notification signal and current boat location sensed by the GPS receiver 220 to the remote user electronic device 202 via cellular communication.

The controller accelerometer 224 works to detect vibration on the body of the boat. A commercially available example of controller accelerometer 224 is LIS3DH from STMicroelectronics (Geneva, Switzerland) which operates on low power. The accelerometer 224 can sense both vibration and acceleration. Relatively, the controller device 102 is programmed to be more reactive to vibration than the rod locker monitoring device 104.

A remote user using the remote user electronic device 202 can adjust the sensitivity to vibration of the controller accelerometer 224. In this embodiment, the controller accelerometer 224 can detect acceleration but the user cannot control the sensitivity to acceleration. Other embodiments may allow the user to control the sensitivity to acceleration. When the controller accelerator 224 senses a vibration stronger than a pre-programmed threshold, the controller device 102 triggers the alarm and sends the current boat location received by the GPS receiver 220 to the remote user electronic device 202 via cellular network.

The GPS receiver 220 receives GPS signals to determine the position of the boat and to transmit boat location to the remote user device 202. The status monitoring system 200 works only when the GPS signal is valid. If the remote user requests the current location of the boat, the status monitoring system 200 transmits the current location information obtained by the GPS receiver 220 to the remote user electronic device 202.

The GPS receiver 220 also works to detect whether the boat moves out of the geofence and to detect the speed of the boat. When the status monitoring system 200 detects an unexpected event, for example, by detecting the boat moving out of the geofenced area at a speed faster than a pre-programmed threshold, the controller device 102 triggers the alarm and transmits the current boat location received by the GPS receiver 220 to the remote user electronic device 202 via cellular network.

The controller device 102 includes a computing device 226 that serves to control and perform various tasks of the controller device 102. The computing device 226 may be a system on a chip (SoC). The computing device 226 controls signal detection and the triggers of the status monitoring system 200. The computing device 226 includes at least one processing device, such as a central processing unit (CPU). The computing device 226 also includes a memory such as a random-access memory (RAM) or a flash memory. The memory may store information and instructions to be executed by the processing device. The computing device 226 processes inputs received by the cellular radio 222 from the remote user electronic device 202 that can access applications via cellular communication.

The controller device 102 is mainly powered by the vehicle battery 240 on the boat. The vehicle battery 240 always keeps the controller battery 216 charged. The only required physical connection the user must make up to allow the status monitoring system 200 to operate is connecting the controller device 102 to the vehicle battery 240. A fishing boat may have an onboard battery charger that is used to charge the vehicle battery 240. The vehicle battery 240 may be charged by the onboard battery charger which is powered from shore power. Shore power supply is generally available at the dock or from any standard outlet. If the vehicle battery 240 power supply is lost, the controller device 102 runs on the rechargeable battery 216 as a back-up power source. Examples of a rechargeable battery include a LiPo battery.

The controller device 102 can further contain an ignition cut off relay circuit by adding two wires on the printed circuit board assembly (PCBA). In this embodiment, the ignition cut off relay is already on the PCBA. The user can choose to make the wire connection between the PCBA and the boat's starting system to make use of this feature. The design uses a normally closed relay that is held in the open position when the status monitoring system 200 is armed so that the vehicle cannot be started. Ignition cut off relay is energized when the status monitoring system 200 is armed. Additional details about the ignition cut off relay are described below with reference to FIG. 12.

The rod locker monitoring devices 104 works to detect an unexpected opening of the rod locker. The rod locker monitoring device 104 includes a rod locker monitoring accelerometer 206, a rod locker monitoring battery 208, a BLE radio 210, and a computing device 212. The rod locker monitoring device 104 can communicate to the controller device 102 via short-range wireless communication such as BLE.

The rod locker monitoring accelerometer 206 works to detect unexpected opening of rod lockers by sensing either vibration or acceleration. The rod locker monitoring accelerometer 206 mainly works to observe acceleration to detect opening of the rod locker while the rod locker monitoring accelerometer 206 also responds to vibration. The rod locker monitoring accelerometer 206 can be LIS3DH from STMicroelectronics (Geneva, Switzerland) which operates on low power. The rod locker monitoring device 104 is powered solely by the rechargeable battery 208. The rechargeable battery 208 can be a LiPo battery.

The computing device 212 serves to control and perform various tasks of the rod locker monitoring device 104. The computing device 212 includes at least one processing device which may be a SoC, and a memory such as a RAM or a flash memory. The processing device is asleep unless awakened by an interrupt caused by the rod locker monitoring accelerometer 206 sensing vibration or acceleration. The processing device is asleep when the processing device is not carrying out a task to operate for extended periods on battery 208 power. When the interrupt wakes the processing device, the rod locker monitoring device 104 sends a rod open trigger to the controller device 102.

The motor monitoring device 106 works to detect intrusion on the boat motor. The motor monitoring device 106 can be used to monitor the entire motor, the propeller, motor cowling or the gearbox. The motor monitoring device 106 protects the motor from unauthorized removal of the motor from the boat. The motor monitoring device 106 includes a motor monitoring accelerometer 234, a motor monitoring battery 236, a BLE radio 228, a GPS receiver 230, and a cellular radio 232. The motor monitoring device 106 can be configured to function independently as a standalone device or as part of the entire status monitoring system 200 via wireless mesh network. When used as part of the mesh network, the motor monitoring device 106 sends trigger condition to the controller device 102, and the controller device 102 then processes the information and carries out various tasks of the entire status monitoring system 200. When used as a standalone device, the motor monitoring device 106 processes the information and carryout the task of the status monitoring system 260 by communicating with the remote user electronic device 202.

The motor monitoring device 106 includes a computing device 238 that serves to control and perform various tasks of the motor monitoring device 106. The computing device 238 includes at least one processing device which may be a SoC, and a memory such as a RAM or a flash memory.

The motor monitoring accelerometer 234 works to detect vibration of the boat motor. The motor monitoring device 106 has a motor monitoring accelerometer 234 so that the status monitoring system 200, 260 may cause a trigger if the motor is tilted, trimmed up or trimmed down. Thefts may trim the motor up to steal only the gearbox or lower unit from the motor. The motor monitoring accelerometer 234 can sense both vibration and acceleration. Similar to the controller device 102, the motor monitoring device 106 is programmed to be more reactive to vibration than the rod locker monitoring device 104. The remote user can adjust the sensitivity to vibration of the motor monitoring accelerometer 234. In this embodiment, the motor monitoring accelerometer 234 can detect acceleration but the user cannot control the sensitivity to acceleration. Other embodiments may allow the remote user to adjust the sensitivity to acceleration.

The motor monitoring device 106 includes a GPS receiver 230 because the motor monitoring device 106 can be used as a standalone device. The GPS receiver 230 receives GPS signal to determine the physical location of the motor. When used in a standalone configuration, the motor monitoring device 106 transmits the location of the motor obtained from the GPS receiver 230 to the cloud 204. The GPS receiver 230 also works to detect whether the boat motor moves out of the geofence and to detect the speed of the motor.

The motor monitoring device 106 is mainly powered by the vehicle battery 240 on the boat. The vehicle battery 240 always keeps the motor monitoring battery 236 charged. If the vehicle battery power supply is lost, the motor monitoring device 106 runs on the rechargeable battery 236 as a back-up power source.

Figure 3:
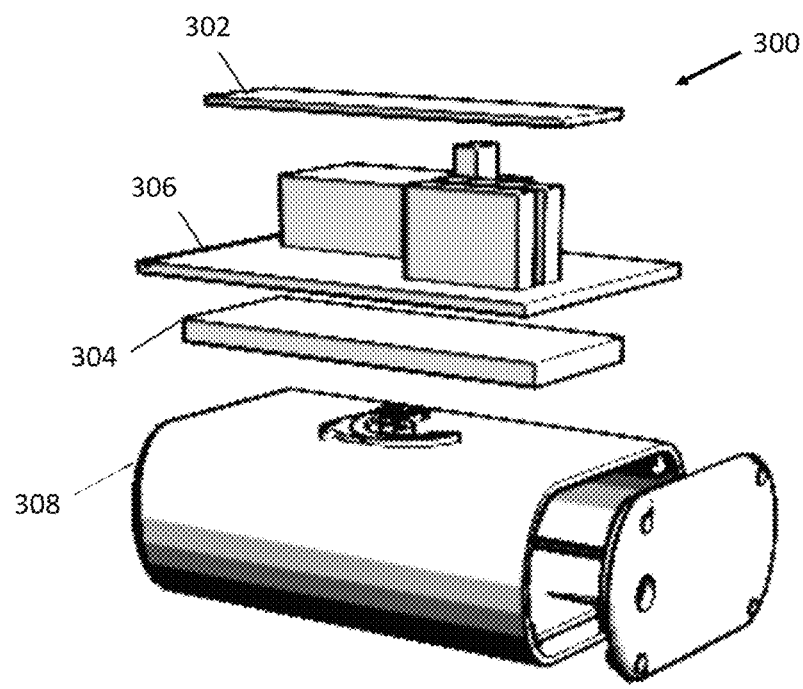
FIG. 3 is a prospective view of an example controller device or the motor monitoring device.

FIG. 3 is an exploded view of an example controller device 300. The controller device 300 includes a cellular antenna 302, the battery 304, printed circuit board assembly (PCBA) 306, and the enclosure 308. The enclosure 308 is where the cellular antenna 302, battery 304, and the PCBA 306 reside. The same assembly 300 is used to construct the motor monitoring device 106 with the only difference being the firmware and the PCBA design. In this example, the battery 304, the PCBA 306, and the enclosure 308 are designed to be as small as possible so that the device 300 can be mounted without drilling holes or running wires. The device 300 should be waterproof but does not have to be watertight.

Figure 4:
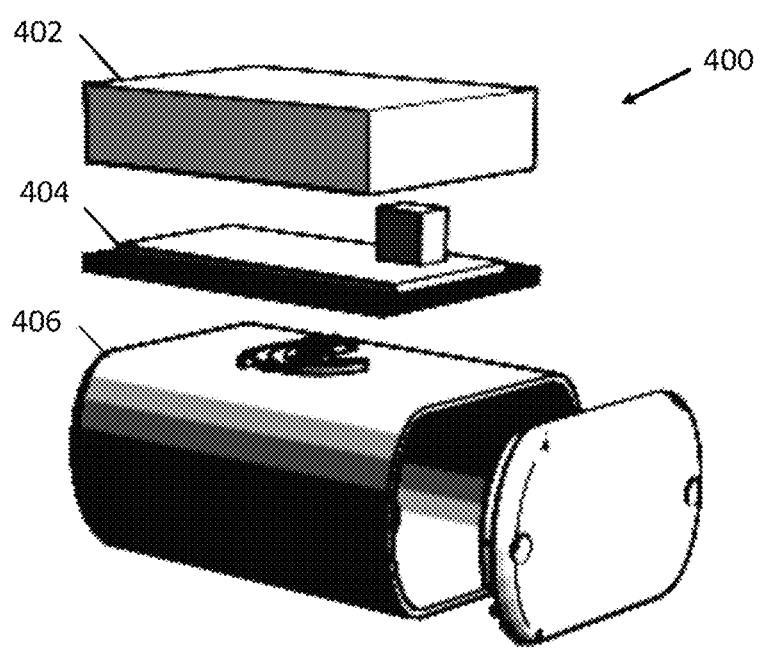
FIG. 4 is a prospective view of an example rod locker monitoring device.

FIG. 4 is an exploded view of an example rod locker monitoring device 400 that is used to monitor the rod locker. The rod locker monitoring device 400 includes the battery 402, printed circuit board assembly 404, and the enclosure 406. The enclosure 406 is where battery 402 and the PCBA 404 reside. In this example, the battery 402, the PCBA 404, and the enclosure 406 are designed to be as small as possible so that the device 400 can be mounted without drilling holes or running wires. The device 400 should be waterproof but does not have to be watertight.

Figure 5:
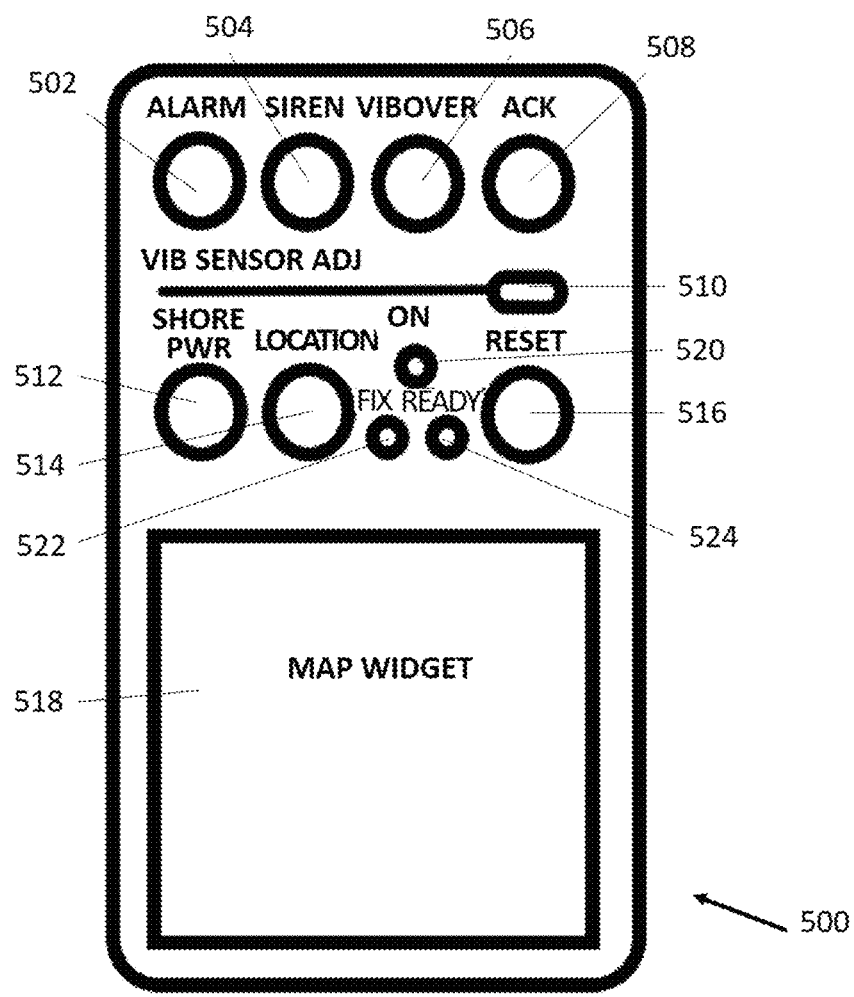
FIG. 5 is an embodiment of an example screenshot of a mobile application to control the status monitoring system.

FIG. 5 is an embodiment of an example screenshot of a mobile application 500 that may be displayed by a remote user electronic device. Mobile application 500 may be used to control the status monitoring system 200 from the remote user electronic device 202. In this embodiment, the remote user electronic device 202 can be a smart phone, tablet computer, computer or the like. In this embodiment, the status monitoring system 200 includes a controller device 102 and five rod locker monitoring devices 104. In other embodiments, the status monitoring system 200 may further include a motor monitoring device 106.

The mobile application 500 provides three LED widgets—FIX 522, CONDITION 524, and ON 520. Each widget has a label on the top and an LED on the bottom. The example mobile application 500 provides multiple buttons—ALARM 502, SIREN 504, VIB OVERRIDE 506, ACK 508, SHORE POWER 512, LOCATION 514, and RESET 516. The color of a button and the label on a button can change depending on the status of the status monitoring system 200. Although not shown in the figure, the mobile application 500 can also use a pop-up notification to show notifications with trigger specific wording. Other names of the buttons or widgets are possible.

The remote user electronic device 202 communicates with the controller device 102 via cellular network to transmit and receive signals to control the status monitoring system 200. In this embodiment, ON widget 520 shows the status of the cellular radio 222 on the controller device 102. ON widget can be labeled either ON or OFF. FIX widget 522 indicates whether the controller device 102 receives a valid GPS signal. FIX widget 522 can be labeled FIX-GOOD or FIX-LOST. CONDITION widget 524 shows the condition of the status monitoring system 200. CONDITION widget 524 can be labeled READY, ARMED, DISARMED, or STDBY. If the status monitoring system 200 further includes a motor monitoring device 106, the remote user electronic device 202 can further communicate with the motor monitoring device 106 via cellular network.

In an example mobile application 500, if the controller device 102 receives a valid GPS signal and is ready to arm the status monitoring system 200, the FIX LED 522 and CONDITION LED 524 changes to green, the FIX widget 522 is labeled FIX-GOOD, and the CONDITION widget 524 is labeled READY. If the controller device 102 does not receive a valid GPS signal, the FIX LED 522 changes to red, the CONDITION LED 524 updates to yellow, the FIX widget 522 is labeled FIX-LOST, and the CONDITION widget 524 is labeled STDBY. If FIX widget 522 is labeled FIX-LOST and CONDITION widget 524 is labeled STDBY, the remote user cannot arm the status monitoring system 200 even if the user presses the ALARM button 502.

ALARM button 502 serves to arm or disarm the status monitoring system 200. When the status monitoring system 200 is armed, the system is ready to actively monitor the status of the boat and alert upon detecting unexpected events on the boat. If CONDITION widget 524 is labeled READY, the user can arm the status monitoring system 200 by pressing the ALARM button 502. If the remote user presses the ALARM button 502, the button background changes to green and the label of the ALARM button 502 changes to ARMED Once the communication is carried out by the controller device 102, the CONDITION LED 524 changes to red, and the label of CONDITION widget 524 updates to ARMED.

SIREN button 504 allows the user to energize or de-energize the siren on the controller device 102. The SIREN button 504 works independently of the state of the status monitoring system 200. If the user presses the SIREN button 504, the remote user electronic device 202 sends a SIREN signal to the cloud 204 and the controller device 102 alarms the siren 214 upon receiving the signal. When the user presses the SIREN button 504 once more, the controller device 102 de-energizes the siren 214.

VIBRATION OVERRIDE (VIB OVERRIDE) button 506 allows the user to override the use of the controller accelerometer 224 on the controller device 102. The user can press the VIB OVERRIDE button 506 to turn off BOAT INTRUSION trigger in a vibration prone environment. If the user presses VIB OVERRIDE button 506 while the status monitoring system 200 is armed, the controller device 102 ignores vibration triggers while reacting to other triggers of the status monitoring system 200. Pressing the VIB OVERRIDE button 506 while the status monitoring system 200 is disarmed has no effect on the controller device 102. If the status monitoring system 200 further includes a motor monitoring device 106, the VIB OVERRIDE button 506 can further be used to override the MOTOR INTRUSION trigger detected by the motor monitoring accelerometer 234.

VIB SENSOR ADJ slider 510 allows the user to adjust the sensitivity of the controller accelerometer 224 on the controller device 102. The user can adjust the slider 510 from left to right. When the slider 510 is adjusted all the way to the left, the sensitivity is 0. When the slider 210 is adjusted all the way to the right, the sensitivity is 10. Other implementations may reverse the sensitivity level extremes (e.g., where all the way left is a sensitivity of 10). If the sensitivity is 0, the status monitoring system 200 virtually triggers all the time. If the sensitivity is 10, the status monitoring system 200 requires higher vibration to trigger BOAT INTRUSION. Both VIB OVERRIDE button 506 and VIB SENSOR ADJ slider 510 allows the user to adjust the status monitoring system 200 for environmental considerations to avoid false triggers. If the status monitoring system 200 further includes a motor monitoring device 106, the VIB SENSOR ADJ slider 510 can further be used to adjust the sensitivity of the motor monitoring accelerometer 234.

ACK button 508 allows the user to acknowledge all triggers. If the user presses the ACK button 508, the remote user electronic device 202 transmits an ACKNOWLEDGE signal to the controller device 102 and the mobile application 500 clears all pins on the MAP widget 518. Pressing the ACK button 508 has an effect on the status monitoring system 200 only if there is an active trigger.

SHORE POWER button 512 allows the user to monitor the presence of the shore power while the vehicle battery 240 is charged. The controller device 102 monitors the presence of shore power when the SHORE POWER button 512 is turned on. This function is optional, and the user can arm the status monitoring system 200 without activating shore power monitor.

LOCATION button 514 allows the user to request the current physical location of the boat at any time. MAP widget 518 displays the location of the boat by dropping the pins on the boat location during trigger events or when the LOCATION button 514 is pressed. If the user presses the LOCATION button 514, the mobile application 500 receives the location of the boat from the controller device 102 and drops a pin on the MAP widget 518 to show the current physical location of the boat. If the controller device 102 is removed from the boat by accident or due to an intrusion, the controller device 102 could still transmit the location of the controller device 102. In this case, the location on the MAP widget 518 may not be the location of the boat, but the location of the controller device 102. In this embodiment, when the user taps the pin while a pin is dropped on the MAP widget 518, a pop-up showing the GPS coordinates of the boat location for that pin appears on the MAP widget. When the user taps the pin a second time, the mobile application 500 clears the pop-up with the GPS coordinates but leaves the pin on the MAP widget 518. If the user presses the ACK button 508, the mobile application 500 may remove both the pop-up with the GPS coordinates and the pin. RESET button 516 allows the user to reset the hardware. If a controller device 102 is reset, the controller device 102 reverts back to the last known state of the hardware.

Figure 6:
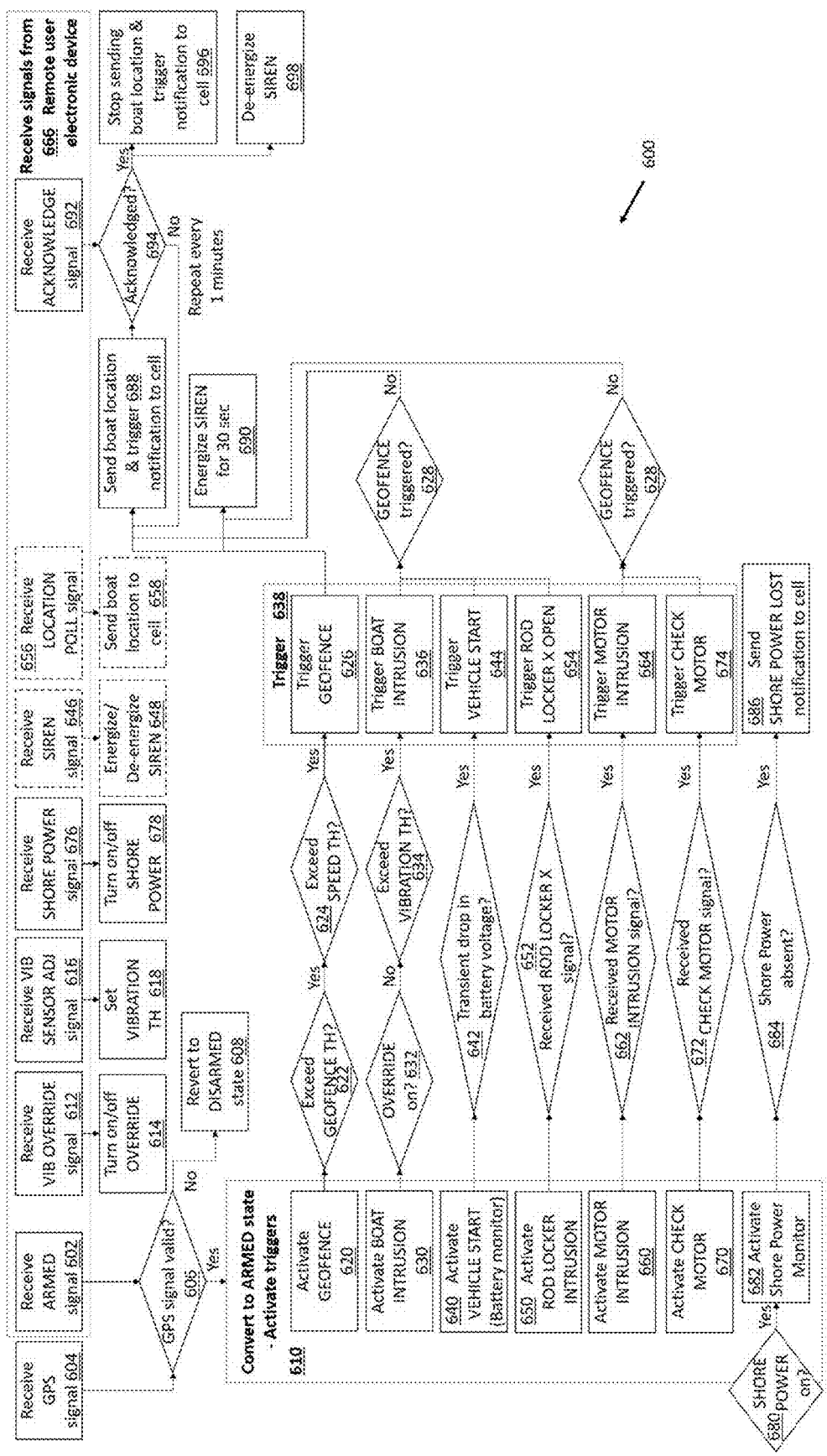
FIG. 6 is an embodiment of an example method for monitoring the status of the boat on the controller device.

FIG. 6 is an embodiment of example method 600 for monitoring status of a boat equipped with the proposed status monitoring system 200 described above in FIG. 2 when a user is not physically on the boat and unable to monitor the boat in person. The diagram shows various processing operations of the controller device 102. Other embodiments can include more or fewer operations.

The controller device 102 communicates with the rod locker monitoring device 104 and the motor monitoring device 106. The controller device 102 receives various signals (operation 666) from the remote user electronic device 202, shown and described above with reference to FIG. 2, when the remote user presses the ALARM button 502 on a remote user mobile application 500 accessible on the remote user electronic device 202, shown and described above with reference to FIG. 5.

The controller device 102 may be configured to receive GPS signals at any time (operation 604). If the controller device 102 receives LOCATION POLL signal (operation 656), the controller device 102 sends current location to the cloud 204 (operation 658), so that a pin can be dropped on the MAP widget 518 on the mobile application 500. The status monitoring method 600 begins when the controller device 102 receives an ARMED signal (operation 602). The controller device 102 determines whether the GPS signal is valid (operation 606).

The controller device 102 converts the status monitoring system 200 to an armed state when the controller device 102 receives the ARMED signal (operation 602) and only if the GPS signal is valid (operation 606). When the status monitoring system 200 converts to an armed state, the controller device 102 activates all the triggers (operation 610) provided in the status monitoring system 200 to start boat monitoring and alert functions. When the controller device 102 determines that the GPS signal is not valid (operation 606), the status monitoring system 200 reverts back to a disarmed state (operation 608).

When the status monitoring system 200 is armed, the controller device 102 activates GEOFENCE 620, BOAT INTRUSION 630, and VEHICLE START 640 triggers. Other embodiments of example method 600 can include more or fewer triggers. In this embodiment, the controller device 102 additionally activates ROD LOCKER INTRUSION 650, MOTOR INTRUSION 660 and CHECK MOTOR 670 triggers, which are triggered when the controller device 102 receives signals from the rod locker monitoring device 104 or the motor monitoring device 106. If an onboard battery charger is plugged into the shore power and when the controller device 102 determines that SHORE POWER button is turned on (operation 680), the controller device 102 further activates shore power monitor trigger (operation 682).

The controller device 102 activates GEOFENCE trigger (operation 620) when the status monitoring system 200 is armed. The controller device 102 resets GPS coordinates for the GEOFENCE trigger each time the controller device 102 receives an ARMED signal. The controller device 102 first determines whether the current physical boat position moves out of the GEOFENCE THRESHOLD boundary compared to the saved initial GPS coordinate (operation 622). If the GEOFENCE THRESHOLD is exceeded, the controller device 102 looks at the speed over ground of the boat to determine whether the speed exceeds the SPEED THRESHOLD (operation 624). For example, the SPEED THRESHOLD can be 7 km/h. The controller device 102 obtains speed over ground based on the change of the GPS coordinates during a certain time period.

If the boat is outside the geofence and speed over ground is greater than the SPEED THRESHOLD, the controller device 102 triggers GEOFENCE (operation 626). The controller device 102 first looks at the GEOFENCE to eliminate drift of GPS signals and allow a smaller GEOFENCE footprint. The status monitoring system 200 considers both distance and speed to avoid false positives due to weak GPS signals.

When GEOFENCE is triggered, all triggers other than GEOFENCE are ignored (operation 628) so that the user is not distracted with nuisance notifications. Once GEOFENCE is triggered, the boat may already have been stolen. As the boat is moving down the road after being stolen, other alarm triggers reacting to vibration such as BOAT INTRUSION and ROD LOCKER OPEN are not important. Additional notifications can be a source of annoyance to the remote user once the boat is stolen. Therefore, the status monitoring system 200 determines whether GEOFENCE is triggered (operation 628) prior to stepping into an alert algorithm following the other triggers besides GEOFENCE trigger. If the controller device 102 detects speed over ground to be less than the pre-programmed threshold or if the boat is inside the GEOFENCE area, all triggers become active.

The controller device 102 activates BOAT INTRUSION trigger (operation 630), which is programmed to respond to boat vibration when the status monitoring system 200 is armed. To avoid false alerts on BOAT INTRUSION trigger, the status monitoring system 200 provides two features to control vibration detection: VIBRATION OVERRIDE and VIB SENSOR ADJ. The status monitoring system 200 provides these two functions to avoid false triggers due to wind or excessive vibration from passing traffic. For example, these features can be useful when the boat is loaded on the trailer on a windy day, or when the boat is parked near a vibration source such as road with heavy traffic passing by.

VIBRATION OVERRIDE function allows the user to turn off only the BOAT INTRUSION trigger while still being able to arm the status monitoring system 200 and use the other triggers.

If the controller device 102 receives VIB OVERRIDE signal (operation 612), the status monitoring system 200 turns on the OVERRIDE function (operation 614) which allows the controller device 102 to override the use of the controller accelerometer 224. When VIB OVERRIDE is turned on, the controller device 102 disables BOAT INTRUSION trigger and ignores vibration sensed by the controller accelerator 224 while leaving the other triggers activated. If the controller device 102 receives VIB OVERRIDE signal (operation 612) while OVERRIDE is turned on, the status monitoring system 200 turns off the OVERRIDE function (operation 614). The status monitoring system 200 also provides VIBRATION SENSOR ADJUSTMENT to give the user the option to adjust the sensitivity to vibration rather than completely ignore boat vibration. If the controller device 102 receives VIB SENSOR ADJUSTMENT signal (operation 616), the status monitoring system 200 sets the corresponding VIBRATION THRESHOLD (operation 618).

When BOAT INTRUSION is activated, the controller device 102 monitors boat vibration measured by a controller accelerometer 224 shown and described above with reference to FIG. 2. The controller accelerometer 224 serves to detect intrusion into the boat. The controller device 102 determines whether OVERRIDE is turned on (operation 632). If the controller device 102 determines that OVERRIDE is turned off, the controller device 102 then determines whether vibration exceeds VIBRATION THRESHOLD (operation 634). If the boat vibration exceeds VIBRATION THRESHOLD, the controller device 102 triggers BOAT INTRUSION (operation 636).

The controller device 102 activates VEHICLE START trigger (operation 640) when the status monitoring system 200 is armed. The controller device 102 is mainly powered by the vehicle battery 240. VEHICLE START trigger monitors the power provided by the vehicle battery 240. The controller device 102 determines whether there is a transient drop in battery voltage (operation 642). When there is an unexpected attempt to start the vehicle, the controller device 102 may sense a transient drop in battery voltage caused by the drain from the starter. If the controller device 102 detects a transient drop in battery voltage, the controller device 102 triggers VEHICLE START (operation 644).

The controller device 102 activates ROD LOCKER INTRUSION trigger (operation 650) when the status monitoring system 200 is armed. In an example embodiment, there can be up to five rod locker monitoring devices 104. Each rod locker monitoring device 104 monitors status of a single rod locker. When the controller device 102 receives ROD LOCKER X OPEN trigger signal (operation 652) from any one of the rod locker monitoring devices 104, the controller device 102 triggers ROD LOCKER X OPEN. The controller device 102 receives a trigger that a rod locker has been opened by the number of the locker, X.

The controller device 102 activates MOTOR INTRUSION (operation 660) and CHECK MOTOR (operation 670) trigger when the status monitoring system 200 is armed. MOTOR INTRUSION works to energize the siren 214 when the motor monitoring device 106 detects vibration on the motor part of the boat. CHECK MOTOR works to monitor whether the motor was stolen or removed from the vehicle battery 240. When the controller device 102 receives MOTOR INTRUSION trigger signal (operation 662) from the motor monitoring device 106, the controller device 102 triggers MOTOR INTRUSION (operation 664). When the controller device 102 receives CHECK MOTOR trigger signal (operation 672) from the motor monitoring device 106, the controller device 102 triggers CHECK MOTOR (operation 674).

If any one of the conditions for a trigger is met, the status monitoring system 200 triggers an alert. In an example embodiment, when GEOFENCE 626, BOAT INTRUSION 636, VEHICLE START 644, or ROD LOCKER INTRUSION 654 is triggered, the siren 214 energizes for 30 seconds (operation 690), and the controller device 102 sends the current physical boat location and corresponding trigger notification to the cloud 204 (operation 688). Other siren time lengths are possible. When MOTOR INTRUSION 664 or CHECK MOTOR 674 is triggered, the controller device 102 only carries out the task of energizing the siren 214 for 30 seconds (operation 690) because the motor monitoring device 106 can transmit the notification and boat location to the cloud 204.

When the status monitoring system 200 receives two or more triggers, the additional 30-second siren is stacked on top of the previous siren. The timer could run until all triggers have expired. The controller device 102 transmits the boat location every 30 seconds; every 1 minute; every 90 seconds; every two minutes; every three minutes, or every five minutes until the controller device 102 receives an ACKNOWLEDGE signal (operation 692). When the controller device 102 receives an ACKNOWLEDGE signal (operation 692) and determines that the user acknowledged the alert (operation 694), the controller device 102 stops sending boat location and notification to the cloud 204 (operation 696) and the controller device 102 de-energizes the siren (operation 698) if the siren was energized.

The controller device 102 activates shore power monitor (operation 682) when SHORE POWER is on (operation 680) and if an onboard battery charger is plugged into an extension cord which is then plugged into a 110 VAC outlet which can be a shore power. The user can plug the extension cord into the shore power outlet and then connect the other end to the onboard battery charger. Shore power can be available at the dock or from any standard power outlet. The boat has the onboard battery charger that is used to charge the vehicle battery. The user can charge the vehicle battery when the user is not using the boat.

The controller device 102 monitors the power supply provided by the shore power supply. A power adapter on the battery compartment of the boat provides power to the controller device 102. The power adapter is used for monitoring the state of the onboard battery charger, which can show the state of the shore power. The power adapter is plugged into the extension cord which is then plugged into the shore power outlet. The controller device 102 determines whether the voltage from the shore power is lost (operation 684). If the voltage from the power supply is not present, the controller device 102 sends SHORE POWER LOST notification to the cloud 204 (operation 686) advising the remote user that the battery charging power, which is the shore power, has been lost. Additional details about the shore power monitor are described below with reference to FIG. 13.

The controller device 102 can further energize an ignition cut off relay when the status monitoring system 200 is armed. The user can optionally decide to use the ignition cut off relay by additionally connecting two wires. The relay would be placed in the ignition circuit by the user so that when the relay is energized, the relay interrupts the power to the ignition key switch. The ignition cut off relay is a normally closed relay. Normally closed relay allows current through the circuit when the relay is not energized. When the status monitoring system 200 is armed, the relay is energized, and the relay is pulled open and interrupts current. Therefore, the vehicle cannot be started when the status monitoring system 200 is armed. If the relay fails for any reason, the user may not be stranded with a boat that may not start or which may stop running while the user is underway. Additional details about the ignition cut off relay are described below with reference to FIG. 12.

Figure 7:
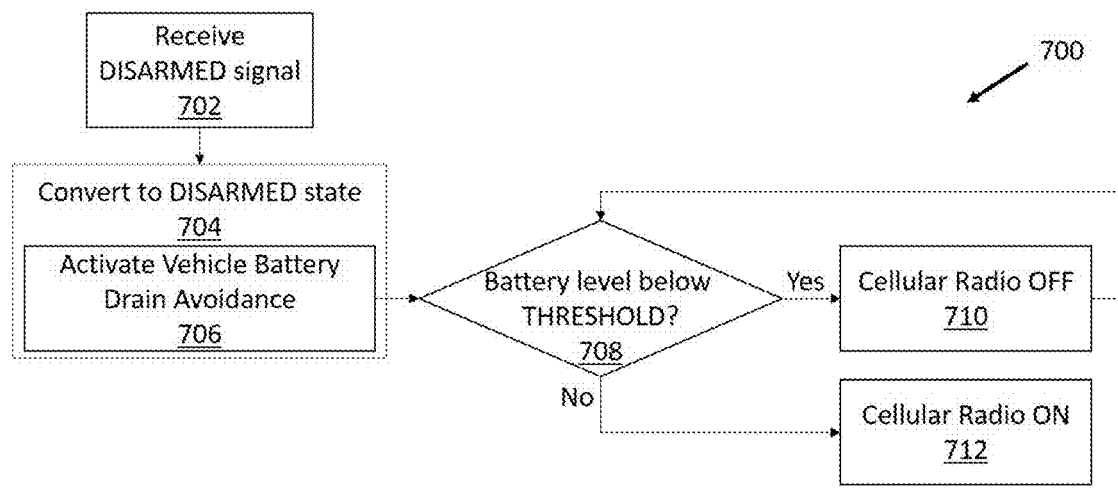
FIG. 7 is an embodiment of an example method for avoiding vehicle battery drain on a boat equipped with the status monitoring system.

FIG. 7 is an embodiment of example method 700 of a vehicle battery drain avoidance function of the controller device 102, shown and described above with reference to FIG. 2. The controller device 102 is mainly powered by the vehicle battery 240. Vehicle battery drain avoidance can eliminate excessive vehicle battery drain caused by the cellular radio 222 when the status monitoring system 200 is disarmed. Vehicle battery drain avoidance allows the controller device 102 to disconnect communications via the cellular radio 222 if the main vehicle battery drops below a preset threshold. When the cellular network signal is weak, the cellular radio 222 can draw the vehicle battery 240 down to a condition where the vehicle battery 240 is no longer able to provide enough power to start the boat, potentially leaving the user stranded. Typically, a user does not run the big motor on the boat, which serves to keep the vehicle battery 240 charged, while the user is fishing on the boat. While fishing, the user may disarm the status monitoring system 200 because the user is on the boat and there is no need to arm the status monitoring system 200 and monitor the status of the boat. Therefore, vehicle battery drain avoidance is active only when the status monitoring system 200 is disarmed.

When the controller device 102 receives a DISARMED signal (operation 702), the status monitoring system 200 converts to disarmed state (operation 704). The controller device 102 activates vehicle battery drain avoidance (operation 706) when the status monitoring system 200 converts to disarmed state (operation 704).

The next operation in the method 700 is to determine whether the battery level is below a pre-programmed threshold (operation 708). If the battery level of the vehicle battery 240 drops below a pre-programmed threshold (operation 708), the cellular radio 222 is turned off (operation 710) to keep the vehicle battery 240 charged. While the cellular radio 222 is off, the controller device 102 still continues to communicate with the rod locker monitoring devices 104 and the motor monitoring device 106 in the status monitoring system 200 via short-range wireless communication.

Once the vehicle battery 240 recovers to a level above the pre-programmed threshold (operation 708), the cellular radio 222 is turned on (operation 712). When the cellular radio 222 is off, the remote user electronic device 202 no longer receives signals from the controller device 102 because the controller device 102 would no longer be in connection with the cellular network.

Generally, the controller device 102 always communicates to the cloud 204 via cellular network. The controller device 102 may send a ping signal every 150 ms to notify the cloud 204 that the connection between the cloud 204 and the controller device 102 is still kept alive. In this embodiment, if the controller device 102 has failed to ping the cloud 204 for up to five minutes, the remote user can be notified that the controller device 102 is offline. Other durations can be used to determine whether the controller device 102 is offline. When the controller device 102 re-connects to the cloud and pings the cloud 204 again, the remote user can be notified that the controller device 102 is online. Each time the controller device 102 turns off or turns on the cellular radio, the remote user using the mobile application 500 on the remote user electronic device 202 can notice the status of the controller device 102.

Figure 8:
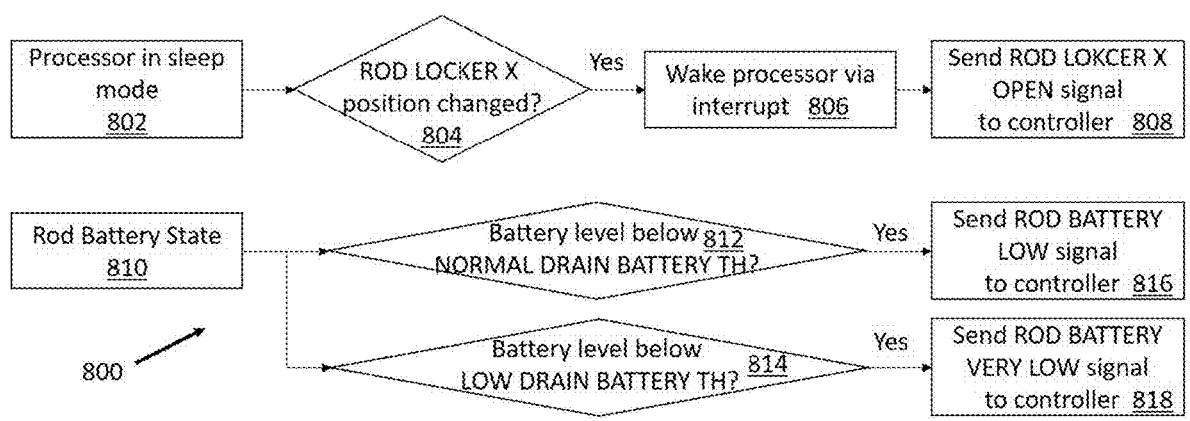
FIG. 8 is an embodiment of an example method for monitoring the status of the boat on the rod locker monitoring device.

FIG. 8 is an embodiment of method 800 for monitoring the status of rod lockers on the rod locker monitoring device 104 which is used as part of the status monitoring system 200, both shown and described above with reference to FIG. 2. The rod locker monitoring device 104 monitors the status of rod lockers. However, since the rod locker monitoring device 104 is solely powered by a battery 208, the default status of the processing device of the rod locker monitoring device 104 is in sleep mode to conserve battery 208 (operation 802).

The rod locker monitoring accelerometer 206 works mainly to observe acceleration, which can detect opening of the rod locker, while the rod locker monitoring accelerometer 206 also responds to vibration. The rod locker monitoring device 104 determines that ROD LOCKER X was open (operation 804) if the rod locker monitoring accelerometer 206 detects acceleration or vibration. X is the number of the rod locker that was intruded. In an example having one vibration sensitivity adjustment slider 510 on the mobile application 500, shown and described above with reference to FIG. 5, the user cannot adjust the sensitivity of the rod locker monitoring accelerometer 206, because the slider 510 works to adjust the sensitivity of the controller accelerometer 224 and the motor accelerometer 234. In other embodiments, a user may be able to adjust the sensitivity of the rod locker monitoring accelerometer 206.

When the rod locker monitoring accelerometer 206 senses acceleration or vibration, the rod locker monitoring device 104 sends an interrupt to the processing device to wake up the processor (operation 806). Once the processor wakes up and notices that an intrusion on a rod locker was detected, the rod locker monitoring device 104 sends ROD LOCKER X OPEN signal to the controller device 102 (operation 808). The whole process (operation 804, 806, 808) may occur continuously regardless of the armed or disarmed state of the status monitoring system 200. However, the controller device 102 processes the ROD LOCKER X OPEN trigger only if the status monitoring system 200 is armed. The rod locker monitoring device 104 does not receive an ARMED signal or DISARMED signal. In contrast to the controller device 102 which reacts to vibration sensed by the controller accelerometer 224 only when the status monitoring system 200 is armed, the rod locker monitoring device 104 always reacts to acceleration sensed by the rod locker monitoring accelerometer 206. The rod locker monitoring device 104 transmits ROD LOCKER OPEN signal to the controller device 102 whenever the rod locker monitoring device 104 detects rod locker vibration. However, ROD LOCKER OPEN trigger is processed on the controller device 102 only if the status monitoring system 200 is armed. The controller device 102 ignores the trigger when the status monitoring system 200 is disarmed.

The rod locker monitoring device 104 is solely powered by an onboard rechargeable battery 208. Typically, the rod locker monitoring device 104 may continuously monitor the state of the battery 208 (operation 810) regardless of the armed or disarmed state of the status monitoring system 200. The rod locker monitoring device 104 monitors two battery thresholds—NORMAL DRAIN BATTERY THRESHOLD and LOW DRAIN BATTERY THRESHOLD. When the rod locker monitoring device 104 determines that the battery level dropped below NORMAL DRAIN BATTERY THRESHOLD (operation 812), the rod locker monitoring device 104 sends ROD BATTERY LOW signal to the cloud 204 (operation 816).

When the rod locker monitoring device 104 determines that the battery level dropped below LOW DRAIN BATTERY THRESHOLD (operation 814), the rod locker monitoring device 104 sends ROD BATTERY VERY LOW signal to the cloud 204 (operation 818). The two notifications allow the user to know that the battery 208 needs to be charged. If the user does not recharge the battery 208, the rod locker monitoring device 104 will shut down completely. If the rod locker monitoring device 104 fails to check in with the controller device 102 ten times, the controller device 102 will send a notification ROD LOCKER X OFFLINE to the cloud 204. In this embodiment, the rod locker monitoring battery 208 can be charged by attaching a USB cable to the rod locker monitoring device 104.

The controller device 102 and the motor monitoring device 106 also monitor the state of the batteries and alerts the remote user to the LOW BATTERY condition of each device. The battery 216, 236 on the controller device 102 or the motor monitoring device 106 should always be receiving a charge because the controller device 102 or the motor monitoring device 106 is mainly powered by the vehicle battery 240. In the event the charge fails, the device may alert the remote user with BATTERY ERROR notification. For example, the battery charge may fail if the battery 216, 236 cannot accept a charge due to battery age.

Figure 9:
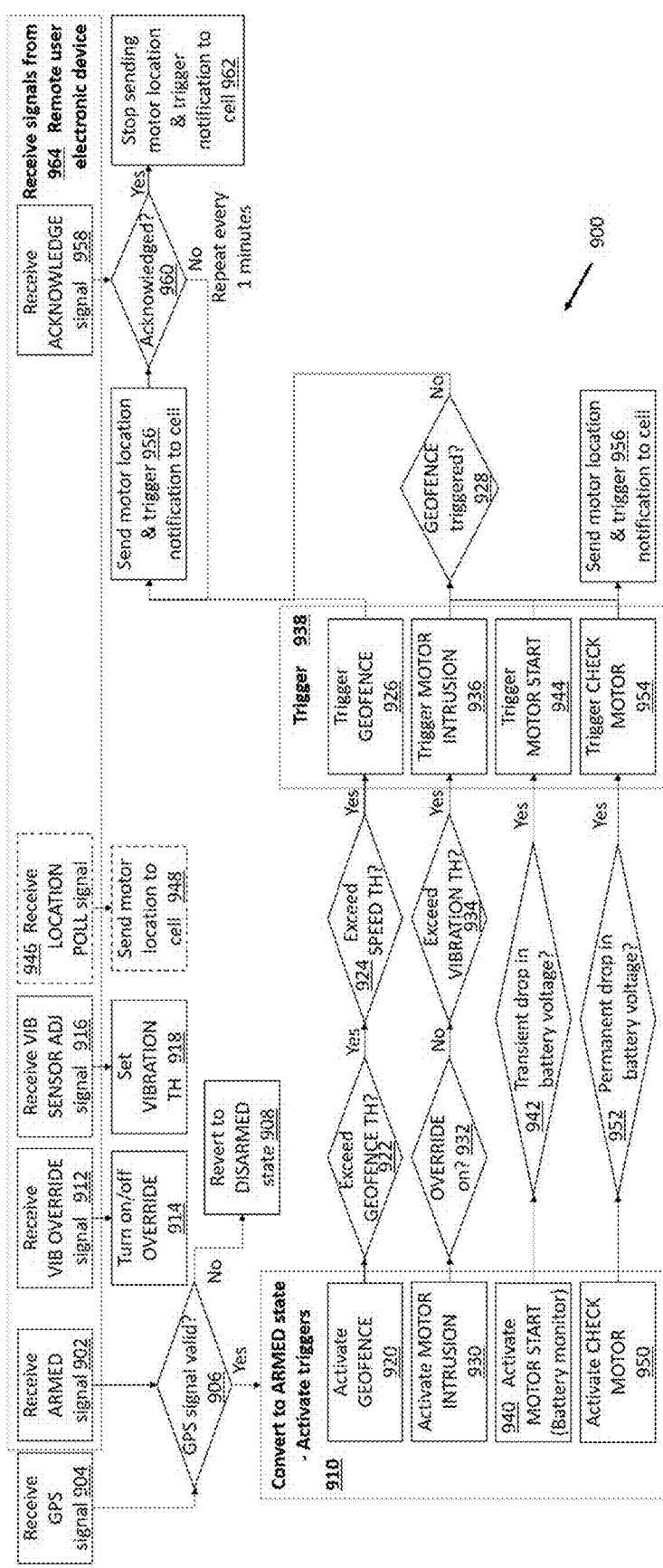
FIG. 9 is an embodiment of an example method for monitoring the status of the boat on the motor monitoring device used in standalone configuration.

FIG. 9 is an embodiment of method 900 for monitoring the status of the boat motor on the motor monitoring device 106, shown and described above with reference to FIG. 2, in a standalone configuration. The motor monitoring device 106 as a standalone configuration works independently as the sole device of the status monitoring system 260. The diagram shows various processing operations of the motor monitoring device 106 used in a standalone configuration. Other embodiments can include more or fewer operations.

The motor monitoring device 106 as a standalone configuration works similar to the status monitoring method 600 on the controller device 102, shown and described above with reference to FIG. 6. The difference is that the motor monitoring device 106 does not communicate with the rod locker monitoring devices 104 and that the motor monitoring device 106 does not include a siren and an ignition cut off relay. The motor monitoring device 106 still performs cellular communication with the remote user electronic device 202. The motor monitoring device 106 receives various signals (operation 964) from the remote user electronic device 202 when the remote user presses the ALARM button 502 on a mobile application 500, shown and described above with reference to FIG. 5.

The motor monitoring device 106 may be configured to receive GPS signals at any time (operation 904). If the motor monitoring device 106 receives LOCATION POLL signal (operation 946), the motor monitoring device 106 sends current physical location of the motor to the cloud 204 (operation 948). The status monitoring method 900 begins when the motor monitoring device 106 receives an ARMED signal (operation 902). The motor monitoring device 106 determines whether the GPS signal is valid (operation 906).

The motor monitoring device 106 converts the status monitoring system 260 to an armed state when the motor monitoring device 106 receives the ARMED signal (operation 902) and only if the GPS signal is valid (operation 906). When the status monitoring system 260 converts to an armed state, the motor monitoring device 106 activates all triggers (operation 910) to start monitoring the motor status and to activate alert functions of the status monitoring system 260. If the GPS signal is not valid (operation 906), the status monitoring system 260 reverts back to disarmed state (operation 908).

When the status monitoring system 260 is armed, the motor monitoring device 106 activates GEOFENCE 920, MOTOR INTRUSION 930, MOTOR START 940, and CHECK MOTOR 950 triggers. Other embodiments of example method 900 can include more or fewer triggers. If any one of the conditions for a trigger is met, the status monitoring system 260 triggers an alert. In an embodiment, when the status monitoring system 260 triggers an alert, the motor monitoring device 106 sends current physical motor location and corresponding trigger notification to the cloud 204 (operation 956). The motor monitoring device 106 does not include a siren. Therefore, a motor monitoring device 106 in a standalone configuration cannot ring a siren to scare off the intruder.

The motor monitoring device 106 activates GEOFENCE trigger (operation 920) when the status monitoring system 260 is armed. The motor monitoring device 106 resets GPS coordinates for the GEOFENCE trigger each time the motor monitoring device 106 receives the ARMED signal (operation 902). The motor monitoring device 106 first determines whether the GPS coordinate moves out of the GEOFENCE THRESHOLD (operation 922). GEOFENCE THRESHOLD is exceeded if the GPS receiver receives a coordinate outside the threshold boundary. If the GEOFENCE threshold is exceeded, the motor monitoring device 106 looks at the speed over ground of the motor to determine whether the speed exceeds the SPEED THRESHOLD (operation 924). The motor monitoring device 106 obtains speed over ground based on the change of the GPS coordinates during a fixed time interval. If the motor is outside the geofence and the speed over ground is greater than a pre-programmed threshold, the motor monitoring device 106 triggers GEOFENCE (operation 926).

When GEOFENCE is triggered, all triggers other than GEOFENCE are ignored so that the user is not distracted with nuisance notifications. Once GEOFENCE is triggered, the motor may already have been stolen. Additional notifications can be a source of annoyance to the remote user once the motor is stolen. Therefore, the status monitoring system 260 always determines whether GEOFENCE is triggered (operation 928) prior to stepping into an alert algorithm following the other triggers besides a GEOFENCE trigger. If the motor monitoring device 106 detects speed over ground which is less than the pre-programmed threshold or if the motor is inside the GEOFENCE area, all triggers become active.

The motor monitoring device 106 activates MOTOR INTRUSION trigger (operation 930), which is programmed to respond to motor vibration when the status monitoring system 260 is armed. To avoid false alerts due to wind or excessive vibration from passing traffic on MOTOR INTRUSION trigger, the status monitoring system 260 provides two features to control vibration detection—VIBRATION OVERRIDE and VIB SENSOR ADJ. VIBRATION OVERRIDE function allows the user to turn off only the MOTOR INTRUSION trigger while still being able to arm the status monitoring system 260 and use the other triggers.

If the motor monitoring device 106 receives VIB OVERRIDE signal (operation 912), the status monitoring system 260 turns on the OVERRIDE function (operation 914) which allows the motor monitoring device 106 to override the use of the motor monitoring accelerometer 234. When VIB OVERRIDE is on, the motor monitoring device 106 ignores vibration sensed by the motor monitoring accelerator 234 which works to detect MOTOR INTRUSION while leaving the other triggers activated. If the motor monitoring device 106 receives VIB OVERRIDE signal (operation 912) while OVERRIDE is already on, the status monitoring system 260 turns off the OVERRIDE function (operation 914). The status monitoring system 260 also provides VIBRATION SENSOR ADJUSTMENT function to give the user the option to adjust the sensitivity to vibration rather than completely ignore boat vibration. If the motor monitoring device 106 receives VIB SENSOR ADJUSTMENT signal (operation 916), the status monitoring system 260 sets the corresponding VIBRATION THRESHOLD (operation 918).

When MOTOR INTRUSION is activated, the motor monitoring device 106 monitors motor vibration measured by a motor monitoring accelerometer 234 shown and described above with reference to FIG. 2. The motor monitoring accelerometer 234 serves to detect intrusion into the motor. The motor monitoring device 106 determines whether OVERRIDE is turned on (operation 932). If the motor monitoring device 106 determines that OVERRIDE is turned off, the motor monitoring device 106 determines whether vibration exceeds VIBRATION THRESHOLD (operation 934). If the vibration exceeds VIBRATION THRESHOLD, the motor monitoring device 106 triggers MOTOR INTRUSION (operation 936).

The motor monitoring device 106 activates MOTOR START trigger (operation 940) when the status monitoring system 260 is armed. The motor monitoring device 106 is mainly powered by the vehicle battery 240. MOTOR START trigger monitors the power provided by the vehicle battery 240. The motor monitoring device 106 determines whether there is a transient drop in battery voltage (operation 942). When there is an unexpected attempt to start the motor, the motor monitoring device 106 can sense a transient drop in battery voltage caused by the drain from the starter. If the motor monitoring device 106 detects a transient drop in battery voltage, the motor monitoring device 106 triggers MOTOR START (operation 944).

The motor monitoring device 106 activates CHECK MOTOR trigger (operation 950). CHECK MOTOR trigger monitors the DC voltage connection between the vehicle battery 240 and the motor. If an intruder cuts all the cables to the motor to remove and steal the motor, the motor monitoring device 106 may lose the DC voltage connection. The motor monitoring device 106 determines whether there is a permanent drop in the battery voltage (operation 952). If the DC voltage goes away while the status monitoring system 260 is armed, the motor monitoring device 106 triggers CHECK MOTOR (operation 954). While MOTOR START trigger 940 serves to notify the user of a short duration drop in the starting battery voltage, CHECK MOTOR trigger 950 alerts the user to the permanent loss of the DC voltage supply. Once the motor monitoring device 106 loses the DC voltage connection and runs only on battery 236 power, the motor monitoring device 106 will sleep. The motor monitoring device 106 may periodically wake up to provide location of the motor monitoring device 106 to the cloud 204.

In the example embodiment method 900, when GEOFENCE, MOTOR INTRUSION, or MOTOR START is triggered, the motor monitoring device 106 sends current physical motor location and corresponding trigger notification to the cloud 204 (operation 956). The motor monitoring device 106 transmits motor location every 30 seconds; every 1 minute; every 90 seconds; every two minutes; every three minutes, or every five minutes until the motor monitoring device 106 receives an ACKNOWLEDGE signal (operation 958). When the motor monitoring device 106 receives an ACKNOWLEDGE signal (operation 958) and determines that the user acknowledged the alert (operation 960), the motor monitoring device 106 stops sending motor location and notification to the cloud 204 (operation 962). When CHECK MOTOR is triggered, after a 15 second delay, the motor monitoring device 106 sends current physical motor location and CHECK MOTOR notification to the cloud 204 (operation 956) just once.

Figure 10:
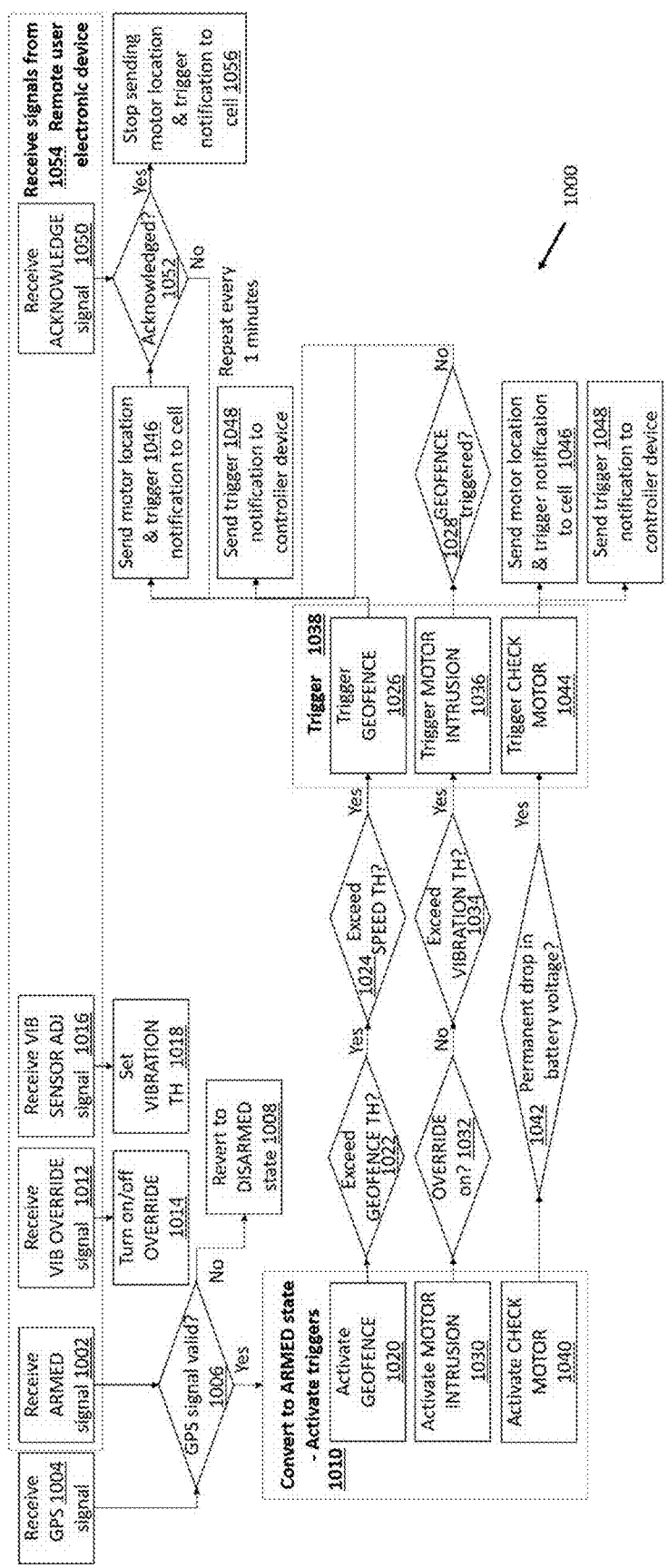
FIG. 10 is an embodiment of an example method for monitoring the status of the boat on the motor monitoring device used as part of a wireless mesh network.

FIG. 10 is an embodiment of method 1000 for monitoring the status of the boat motor on the motor monitoring device 106, shown and described above with reference to FIG. 2, in a mesh configuration. The motor monitoring device 106 in a mesh configuration works as part of the status monitoring system 200 controlled by the controller device 102. Still, the motor monitoring device 106 performs cellular communication with the remote user electronic device 202, shown and described above with reference to FIG. 2. The diagram shows various processing operations of the motor monitoring device 106 used in a mesh configuration. Other embodiments can include more or fewer operations. The motor monitoring device 106 receives various signals (operation 1054) from the remote user electronic device 202 when the remote user presses the ALARM button 502 on a mobile application 500 accessible on the remote user electronic device 202, shown and described above with reference to FIG. 5.

The motor monitoring device 106 may be configured to receive GPS signals at any time (operation 1004). The status monitoring method 1000 begins when the motor monitoring device 106 receives an ARMED signal (operation 1002). The motor monitoring device 106 determines whether the GPS signal is valid (operation 1006). The motor monitoring device 106 converts the status monitoring system 200 to an armed state when the motor monitoring device 106 receives the ARMED signal (operation 1002) and only if the GPS signal is valid (operation 1006). When the status monitoring system 200 converts to an armed state, the motor monitoring device 106 activates all the triggers (operation 1010) to start monitoring the motor and to activate alert functions. If the GPS signal is not valid (operation 1006), the status monitoring system 200 reverts back to a disarmed state (operation 1008).

When the status monitoring system 200 is armed, the motor monitoring device 106 activates GEOFENCE 1020, MOTOR INTRUSION 1030, and CHECK MOTOR 1040 triggers. Other embodiments of example method 1000 can include more or fewer triggers.

The motor monitoring device 106 activates GEOFENCE trigger (operation 1020) when the status monitoring system 200 is armed. The motor monitoring device 106 resets GPS coordinates for the GEOFENCE trigger each time the motor monitoring device 106 receives the ARMED signal. The motor monitoring device 106 first determines whether the coordinate moves out of the GEOFENCE THRESHOLD (operation 1022). If the GEOFENCE THRESHOLD is exceeded, the motor monitoring device 106 looks at the speed over ground of the motor to determine whether the speed exceeds SPEED THRESHOLD (operation 1024). If the motor is outside the GEOFENCE and the speed over ground is greater than SPEED THRESHOLD, the motor monitoring device 106 triggers GEOFENCE (operation 1026).

The motor monitoring device 106 activates MOTOR INTRUSION trigger (operation 1030), which is programmed to respond to motor vibration when the status monitoring system 200 is armed. To avoid false alerts on MOTOR INTRUSION trigger, the status monitoring system 200 provides two features to control vibration detection—VIBRATION OVERRIDE 1012 and VIB SENSOR ADJ 1016. The same VIBRATION OVERRIDE 612 and VIB SENSOR ADJ 616 signals, shown and described above with reference to FIG. 6 also applies to control MOTOR INTRUSION triggers. VIBRATION OVERRIDE function allows the user to turn off only the MOTOR INTRUSION trigger while still being able to arm the status monitoring system 200 and use the other triggers.

If the motor monitoring device 106 receives VIB OVERRIDE signal (operation 1012), the status monitoring system 200 turns on the OVERRIDE function (operation 1014) which allows the motor monitoring device 106 to override the use of the motor monitoring accelerator 234. When VIB OVERRIDE is on, the motor monitoring device 106 disables the MOTOR INTRUSION trigger and ignores vibration sensed by the motor monitoring accelerator 234 while leaving the other triggers activated.

If the motor monitoring device 106 receives VIB OVERRIDE signal (operation 1012) while OVERRIDE is already on, the status monitoring system 200 turns off the OVERRIDE function (operation 1014). The status monitoring system 200 also provides VIBRATION SENSOR ADJUSTMENT function to give the user the option to adjust the sensitivity to vibration rather than completely ignore boat vibration. If the motor monitoring device 106 receives VIB SENSOR ADJUSTMENT signal (operation 1016), the status monitoring system 200 sets the corresponding VIBRATION THRESHOLD (operation 1018).

When MOTOR INTRUSION is activated (operation 1030), the motor monitoring device 106 monitors motor vibration measured by a motor monitoring accelerometer 234. The motor monitoring accelerometer 234 serves to detect intrusion into the motor. The motor monitoring device 106 determines whether OVERRIDE is turned on (operation 1032). If the motor monitoring device 106 determines that OVERRIDE is turned off, the motor monitoring device 106 determines whether vibration exceeds VIBRATION THRESHOLD (operation 1034). If the vibration exceeds VIBRATION THRESHOLD, the motor monitoring device 106 triggers MOTOR INTRUSION (operation 1036).

The motor monitoring device 106 activates CHECK MOTOR trigger (operation 1040). CHECK MOTOR trigger monitors the DC voltage connection between the vehicle battery 240 and the motor. If an intruder cuts all the cables to the motor to remove and steal the motor, the motor monitoring device 106 will lose the DC voltage connection. The motor monitoring device 106 determines whether there is a permanent drop in the battery voltage (operation 1042). If the DC voltage goes away while the status monitoring system 200 is armed, the motor monitoring device 106 triggers CHECK MOTOR (operation 1044).

In the example embodiment method 1000, when GEOFENCE, MOTOR INTRUSION is triggered, the motor monitoring device 106 sends current physical motor location and corresponding trigger notification to the cloud 204 (operation 1046) and sends trigger notification to the controller device 102 (operation 1048). Since the motor monitoring device 106 does not include a siren, the controller device 102 can energize the siren 214 when the controller device receives a trigger notification from the motor monitoring device 106 as described above with reference to FIG. 6. The motor monitoring device 106 transmits motor location every 30 seconds; every 1 minute; every 90 seconds; every two minutes; every three minutes, or every five minutes until the device receives an ACKNOWLEDGE signal (operation 1050). When the motor monitoring device 106 receives an ACKNOWLEDGE signal (operation 1050) and determines that the user acknowledged the alert (operation 1052), the motor monitoring device 106 stops sending motor location and notification to the cloud 204 (operation 1056). When CHECK MOTOR is triggered, after a 15 second delay, the motor monitoring device 106 sends current physical motor location and CHECK MOTOR notification to the cloud 204 (operation 1046) and sends trigger notification to the controller device 102 (1048) just once.

Figure 11:
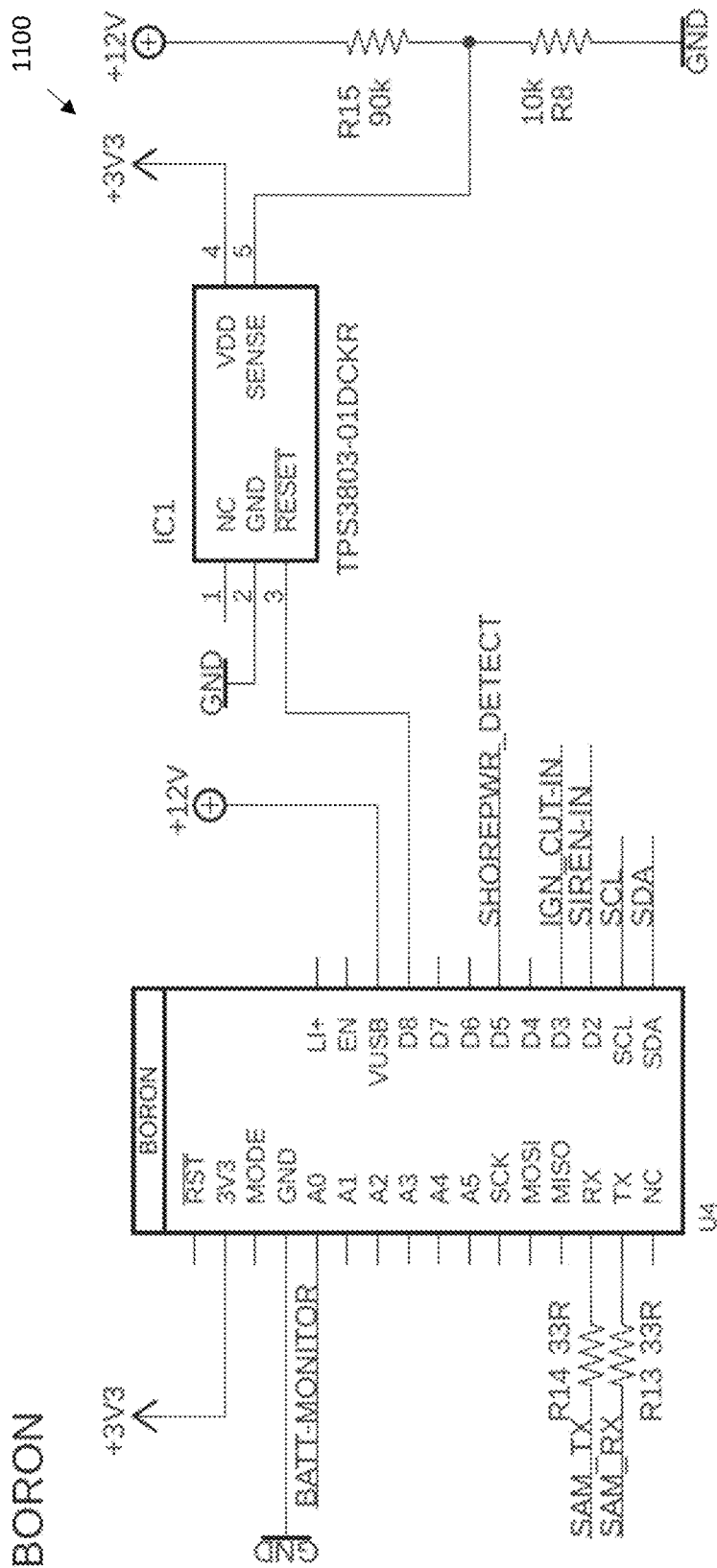
FIG. 11 is a circuit diagram of an embodiment of an example circuit used in the controller device.

FIG. 11 is a circuit diagram of an embodiment of an example circuit 1100 of the controller device 102 used in a status monitoring system 200, described above with reference to FIG. 2. The circuit diagram shows a PCBA design including a computing device (BORON) and various connections to the computing device. A commercially-available example of the developer kit is BORON from Particle Industries, Inc (San Francisco, Calif.) which is equipped with a main processor—Nordic nRF52840 SoC from Nordic Semiconductor (Trondheim, Norway) and a cellular network processor—R410M LTE Cat M1 module from u-blox (Thalwil, Switzerland). BORON consists of pins that are either ON or OFF as controlled by the firmware. In addition to the default configuration, this embodiment uses pins to connect the computing device to the siren circuit (D2, SIREN-IN), ignition cut off circuit (D3, IGN CUT-IN), shore power circuit (D5, SHOREPWR_DETECT), accelerometer circuit (SCL, SDA), GPS circuit (SAM_RX, SAM Tex.), and a power supply with circuit protection and reverse polarity protection. IC1, which is connected to D8, detects the transient nature of the supply voltage which triggers VEHICLE START. Pin A0 (BATT-MONITOR) is connected to the vehicle battery 240 and handles various tasks related to the vehicle battery. R13 and R14 works to filter radio-frequency interference (RFI) noise. R8 and R15 acts as a voltage divider to provide the correct voltage to IC1. In this embodiment, IC1 can be TPS3803-01DCKR manufactured by Texas Instruments, Inc. (Dallas, Tex.). TPS3803-01DCKR requires the threshold voltage on SENSE to be approximately 1.2V. The resistances of R8 and R15 are 10 kΩ and 90 kΩ, respectively, to apply 1.2V on the SENSE pin on IC1.

The circuit is built to work specifically for embodiments of status monitoring system 200. For example, if the controller device receives an ACKNOWLEDGE signal, siren (D2) turns low to turn off the siren. If the status monitoring system 200 is disarmed, pin A0 is active to perform the vehicle battery drain avoidance function.

3 VDC power is provided by a power adapter in the battery compartment of the boat. The controller device 102 receives power on pin D5 when the power adapter is plugged in to 110 VAC from a standard shore power outlet. The shore power circuit monitors the 3 VDC supply provided by the shore power supply via the power adapter. In turn, the controller device monitors the 3 VDC supply via the shore power circuit. In this embodiment, the shore power circuit is not optional. The shore power circuit in this embodiment uses all digital components built on to the PCBA. The shore power circuit is an active LOW circuit. When the power adapter provides 3 VDC power to the pin (3V3) on the computing device, the pin (3V3) is pulled to LOW. When the 3 VDC power goes away (operation 684), the pin (3V3) goes HIGH and the controller device 102 responds to that change by transmitting a notification to the cloud 204 that shore power is lost. Additional details about the shore power monitor are described below with reference to FIG. 13.

Ignition cut off relay is an optional configuration requiring addition of two wires. The design allows the user to interrupt one wire of the ignition cut off circuit by placing the ignition cut off relay in series of the circuit. The ignition cut off relay is a normally closed relay that is held in the open position when the status monitoring system 200 is armed. When the status monitoring system 200 is armed, even if a user had the key and turned the ignition, nothing would happen because the relay is held open and interrupts the circuit. Additional details about the ignition cut off relay are described below with reference to FIG. 12.

The embodiment has an input circuit protection and reverse polarity circuit receiving power from the vehicle battery. The power supply from the vehicle battery passes through the input circuit protection and reverse polarity circuit and provides power to the computing device via VUSB. The input circuit protection works to limit voltage input from the vehicle battery 240 to avoid spikes or drops in the supply voltage as well as a fuse and a diode. The reverse polarity protection portion of the circuit protects the PCBA in the event when the user wires the circuit in reverse.

Figure 12:
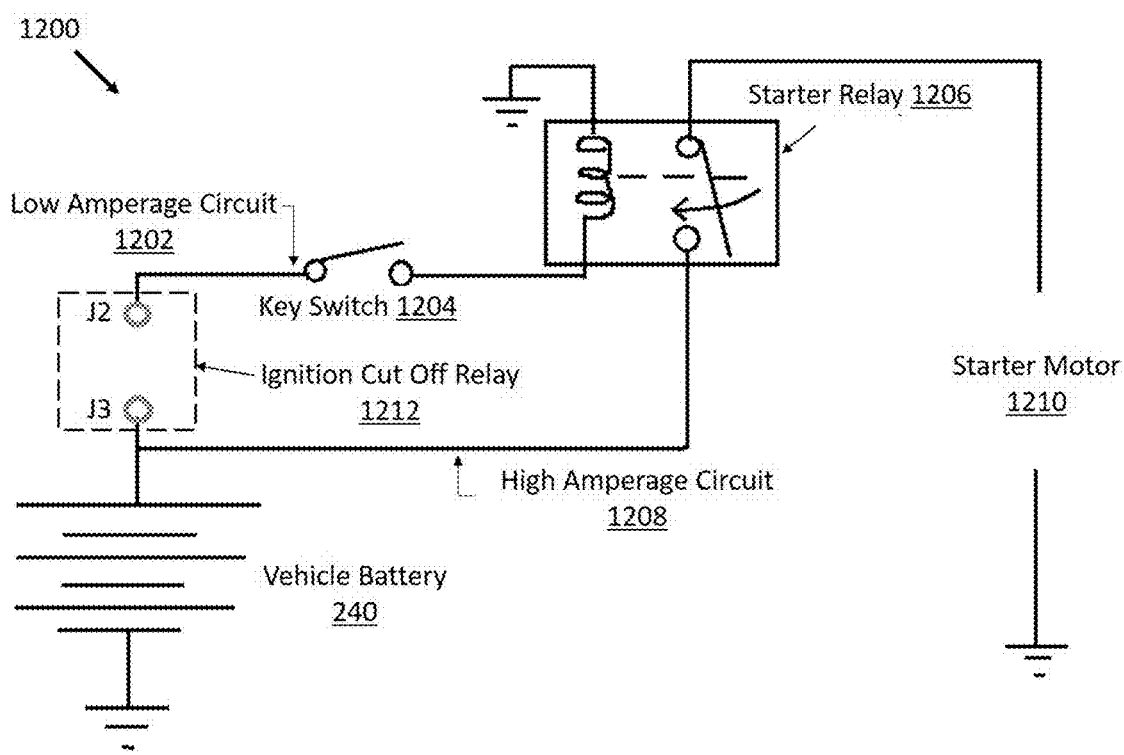
FIG. 12 is a circuit diagram of an embodiment of an example vehicle starting circuit.

FIG. 12 is a circuit diagram of an embodiment of an example vehicle starting circuit 1200. An ignition cut off relay 1212 may be placed on the low amperage circuit 1202. The ignition cut off relay 1212 works to interrupt the boat's ignition circuit on the low amperage circuit 1202 side of the vehicle starting circuit 1200. A vehicle starting circuit 1200 has two components, a high amperage and a low amperage side. The starter motor 1210 requires very high amperage to operate. In a typical vehicle starting circuit, a key switch 1204 is connected to the vehicle battery 240 via the low amperage circuit 1202. When a boat user turns the key to start the vehicle, the circuit activates a solenoid on a starter relay 1206 that allows for a transfer of high amperage current to flow to the starter motor 1210 and completes a high amperage circuit 1208, which in turn energizes the starter motor 1210 to start the boat.

In this embodiment, the low amperage circuit 1202 is interrupted by J2 and J3. The user can choose to make a wire connection between the controller device 102 and the vehicle starting circuit 1200. The wires from the controller device 102 would attach to the vehicle start circuit 1200 via J2 and J3. In this embodiment, the ignition cut off relay 1212 is normally closed. When the status monitoring system 200 is armed, the ignition cut off relay 1212 is pulled normally open. When the ignition cut off relay 1212 is pulled normally open, the vehicle start circuit 1200 is incomplete, which makes it impossible for the vehicle to start.

Figure 13:
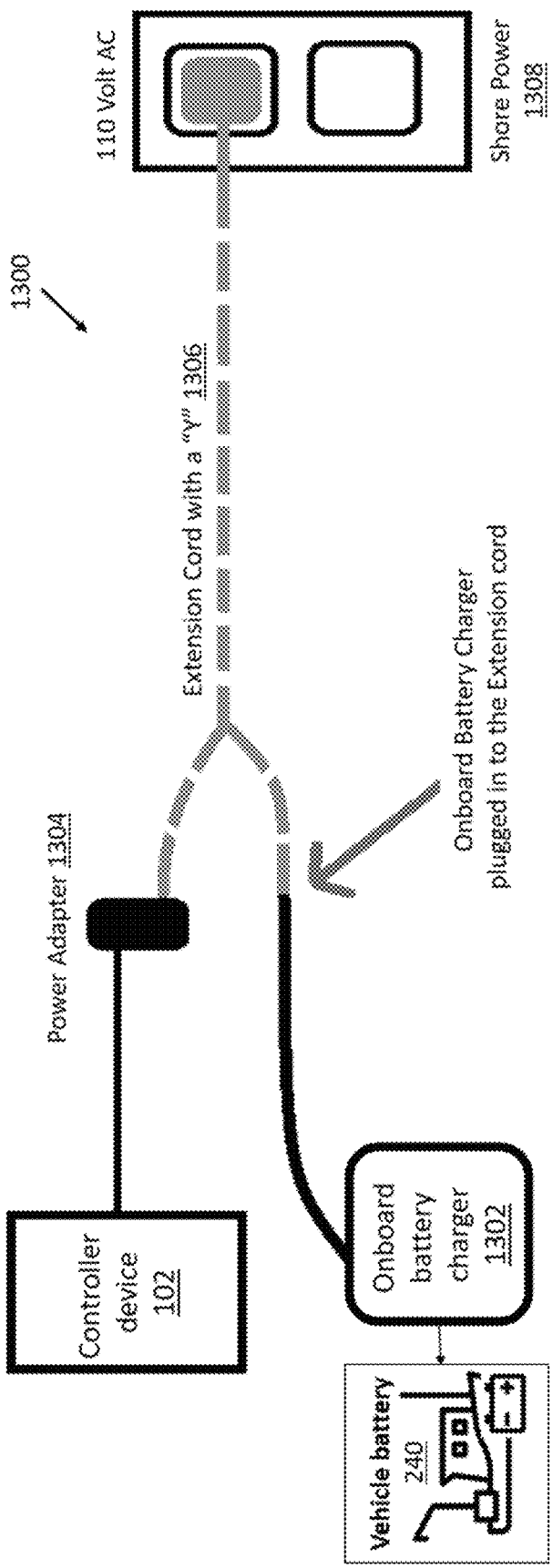
FIG. 13 is an embodiment of a connection from a shore power outlet to the controller device and the vehicle battery.

FIG. 13 is an embodiment of a connection from a shore power outlet 1308 to the controller device 102 and the vehicle battery 240. A power adapter 1304 is in the same battery compartment in which the controller device 102 is placed. Shore power is generally available at the dock or from any standard outlet. In this embodiment, shore power is available at the shore power outlet 1308. Generally, power supply from the shore power outlet 1308 is 110 VAC. When an extension cord 1306 is plugged into the shore power outlet 1308, the 110 VAC power may be present in the extension cord 1306. When an onboard battery charger 1302 is plugged into the extension cord 1306, the onboard battery charger 1302 is powered on. The vehicle battery 240 is charged by the onboard battery charger 1302 which is powered from power from the shore power outlet 1308. The onboard battery charger 1302 converts the power from the shore power outlet 1308 which is 110 VAC to approximately 13.8 VDC. Similarly, when a power adapter 1304 is plugged into the extension cord 1306, the power adapter 1304 is powered on. The power adapter takes the 110 VAC and converts it to 3 VDC.

The controller device 102 monitors the 3 VDC input on pin D5, shown in FIG. 11. The PCBA is designed to overcome issues related to GROUND and issues caused by combined use of an AC circuit and a DC circuit. Therefore, pin D5 is active low. Whenever there is 3 VDC present on pin D5, pin D5 is LOW. When the 3 VDC goes away, pin D5 goes HIGH. Only when the 110 VAC power from the shore power outlet 1308 goes away, the 3 VDC on pin D5 which comes from the power adapter 1304 may be lost because the 3 VDC power on the power adapter 1304 is supplied from the shore power 1308. Similarly, when the 110 VAC power from the shore power outlet 1308 goes away, the power on the onboard battery charger 1302 may also be lost because both the power adapter 1304 and the onboard battery charger 1302 are both plugged into the same extension cord 1306. Therefore, the status monitoring system 200 triggers SHORE POWER LOST notification (operation 686), shown and described in FIG. 6, when pin D5 goes HIGH, which happens when the 3 VDC on pin D5 is lost, which happens when the 110 VAC power input on the power adapter 1304 is lost, which happens only when the power from the shore power outlet 1308 is lost. The 110 VAC power can be lost when the extension cord 1306 is unplugged, when the boat is vandalized, or when the shore power at the shore power outlet 1308 is lost.

The invention claimed is:
1. A status monitoring system comprising:
a controller device comprising:
  a communication device configured to communicate with a remote user electronic device;
  a master node of a wireless mesh network configured to communicate with at least one rod locker monitoring device;
  a first accelerometer;
  a global positioning system (GPS) receiver; and
  a siren;
the at least one rod locker monitoring device configured to monitor a rod locker status and being attached to a rod locker, the at least one rod locker monitoring device comprising:
  a slave node of the wireless mesh network configured to communicate with the master node; and
  a second accelerometer;
the at least one rod locker monitoring device being programmed to:
  receive second vibration data from the second accelerometer;
  determine whether the second vibration data exceeds a pre-programmed threshold; and
  send a rod locker open status notification to the controller device when the second vibration data exceeds the pre-programmed threshold;
the controller device being programmed to:
  receive an activation signal from the remote user electronic device;
  receive boat location data from the GPS receiver;
  set an initial boat location when the controller device receives the activation signal;
  determine a boat location change by comparing current boat location data received from the GPS receiver and the initial boat location;

determine a boat speed by calculating a boat location change during a pre-programmed time period;
determine whether a boat location change and a boat speed both exceed pre-programmed thresholds; and
when the boat location change and the boat speed both exceed pre-programmed thresholds, energize the siren and send a boat geofence status notification and the boat location to the remote user electronic device.

2. The status monitoring system according to claim 1, the controller device further being programmed to:
receive first vibration data from the first accelerometer;
determine whether the first vibration exceeds a user-set threshold;
when the first vibration exceeds a user-set threshold, energize the siren and send boat vibration status notification and the boat location to the remote user electronic device;
receive rod locker open status notification from the rod locker monitoring device; and
when receiving the rod locker open status notification from the rod locker monitoring device, energize the siren and send rod locker open status notification and the boat location to the remote user electronic device.

3. The status monitoring system according to claim 2, further comprising a motor monitoring device configured to monitor a status of an outboard motor, the motor monitoring device comprising:
a motor monitoring communication device configured to communicate with a remote user electronic device;
a motor node of the wireless mesh network configured to communicate with the master node;
a third accelerometer; and
a motor monitoring GPS receiver;
the controller device being further configured to communicate with the motor monitoring device;
the motor monitoring device being programmed to:
receive motor location data from the motor monitoring GPS receiver;
set an initial motor location when the status monitoring system is activated;
determine a motor location change by comparing current motor location data received from the motor monitoring GPS receiver and the initial motor location;
determine a motor speed by calculating a motor location change during a pre-programmed time period;
determine whether the motor location change and the motor speed both exceed pre-programmed thresholds;
when the motor location change and the motor speed both exceed pre-programmed thresholds, send a motor geofence status notification to the controller device and send a motor geofence status notification and the motor location to the remote user electronic device;
receive third vibration data from the third accelerometer;
determine whether the third vibration data exceeds a user-set threshold;
when the third vibration exceeds a user-set threshold, send a motor vibration status notification to the controller device and send a motor vibration status notification and the motor location to the remote user electronic device;

the controller device being further programmed to:
receive motor status notifications from the motor monitoring device;
when receiving motor geofence status notification from the motor monitoring device, energize the siren; and
when receiving motor vibration status notification from the motor monitoring device, energize the siren.

4. The status monitoring system according to claim 3, the controller device, the motor monitoring device, and the rod locker monitoring device further comprising a battery,
the controller device and the motor monitoring device being connected to a vehicle battery;
the controller device and the motor monitoring device configured to receive power from the vehicle battery;
the controller device and the motor monitoring device configured to receive power from the battery when the power supply from the vehicle battery is lost; and
the rod locker monitoring device configured to receive power from the battery.

5. The status monitoring system according to claim 3, wherein the motor monitoring device can operate independently in a standalone configuration without communicating to the master node via the wireless mesh network.

6. The status monitoring system according to claim 4, wherein the battery is a rechargeable battery.

7. The status monitoring system according to claim 4, the controller device being further programmed to:
monitor the battery level of the vehicle battery;
determine whether there is a transient drop in battery level caused by a drain from the vehicle start; and
when there is a transient drop in battery level, energize the siren and send vehicle start status notification and the boat location to the remote user electronic device.

8. The status monitoring system according to claim 4, wherein the vehicle battery is charged by the onboard battery charger, the onboard battery charger being powered from shore power.

9. The status monitoring system according to claim 8, the controller device further comprising a shore power monitor circuit,
the shore power monitor circuit configured to be connected to a power adapter;
the power adapter configured to take power from the shore power; and
the shore power monitor circuit configured to monitor power supply from the shore power to the power adapter.

10. The status monitoring system according to claim 9, the controller device further being programmed to:
determine whether a power supply from the shore power is present on the power adapter; and
when the power supply to the power adapter from the shore power is lost, send shore power lost status notification to the remote user electronic device.

11. The status monitoring system according to claim 1, further comprising an ignition cut off relay that interrupts the power to the ignition key switch.

12. A method for monitoring a status of a fishing boat, the method comprising the steps of:
receiving an activation signal from a remote user electronic device;
receiving GPS signals from a GPS receiver;
receiving a boat vibration signal from a first accelerometer;
receiving a rod vibration signal from a second accelerometer;
receiving a motor vibration signal from a third accelerometer;

setting an initial boat location when receiving the activation signal;

determining a boat location change by comparing current boat location data received from the GPS receiver and the initial boat location;

determining a boat speed by calculating boat location change during a pre-programmed time period; and energizing a siren and transmitting a trigger status notification and the boat location to the remote user electronic device when detecting at least one of: a geofence trigger, a boat intrusion trigger, a rod intrusion trigger, a motor intrusion trigger, or a vehicle start trigger, wherein the geofence trigger is triggered when the boat location change and the boat speed exceed a pre-programmed threshold;

wherein the boat intrusion trigger is triggered when the boat vibration exceeds a user-set threshold;

wherein the rod intrusion trigger is triggered when receiving rod intrusion status from a rod locker monitoring device after the rod locker vibration exceeds a pre-programmed threshold;

wherein the motor intrusion trigger is triggered when receiving motor intrusion status from a motor monitoring device after the motor vibration exceeds a user-set threshold;

wherein the vehicle start trigger is triggered when detecting a transient drop in the vehicle battery level below a pre-programmed threshold; and disabling the siren and terminating GPS coordinate transmission to the remote user electronic device when receiving acknowledgement signal from the remote user electronic device.

13. The method of claim 12, wherein de-activating all other triggers besides the geofence trigger when the geofence trigger is triggered.

14. The method of claim 12, further comprising the steps of:

receiving power from a power adapter taking power from shore power;

receiving shore power activation signal from the remote user electronic device; and energizing the siren and sending a shore power lost status notification to the cellular device when detecting shore power monitor trigger, the shore power monitor trigger triggered when power supply to the power adapter from the shore power is lost.

15. A method for extending the life of a vehicle battery with a controller device comprising a cellular radio and a computing device, the method comprising the steps of:

monitoring the vehicle battery level;

sending a low battery status notification to a remote user electronic device via a mobile device application;

sending a command to the cellular radio to turn off the cellular radio when the vehicle battery level drops below a pre-programmed threshold;

when the vehicle battery level recovers above the pre-programmed threshold, sending a command to the cellular radio to turn the cellular radio on; and updating a status in the mobile device application.

* * * * *